(12) United States Patent
Funase et al.

(10) Patent No.: US 10,591,310 B2
(45) Date of Patent: Mar. 17, 2020

(54) TRAVEL INFORMATION PROVIDING METHOD, TRAVEL INFORMATION PROVIDING APPARATUS, AND NON-TRANSITORY RECORDING MEDIUM

(71) Applicant: Panasonic Intellectual Property Corporation of America, Torrance, CA (US)

(72) Inventors: Kazuki Funase, Osaka (JP); Kenji Tagawa, Osaka (JP); Tetsuji Fuchikami, Osaka (JP); Akinori Ozeki, Kanagawa (JP); Hideshi Aoki, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 189 days.

(21) Appl. No.: 15/843,147

(22) Filed: Dec. 15, 2017

(65) Prior Publication Data

US 2018/0106639 A1 Apr. 19, 2018

Related U.S. Application Data

(63) Continuation of application No. PCT/JP2016/004811, filed on Nov. 4, 2016.

(30) Foreign Application Priority Data

Nov. 16, 2015 (JP) ................................. 2015-224328

(51) Int. Cl.
*G01C 21/36* (2006.01)
*B61L 25/02* (2006.01)
(Continued)

(52) U.S. Cl.
CPC .......... *G01C 21/3691* (2013.01); *B61L 25/02* (2013.01); *G01C 21/3423* (2013.01);
(Continued)

(58) Field of Classification Search
None
See application file for complete search history.

(56) References Cited

U.S. PATENT DOCUMENTS

| 2012/0290652 | A1* | 11/2012 | Boskovic | ............... G06Q 10/02 709/204 |
| 2014/0357261 | A1* | 12/2014 | Chiu | ..................... H04W 4/029 455/426.1 |
| 2015/0294298 | A1* | 10/2015 | Michishita | ............ G06Q 30/06 705/13 |

FOREIGN PATENT DOCUMENTS

| JP | 2009-085784 | 4/2009 |
| JP | 2009-234345 | 10/2009 |
| JP | 2012-142776 | 7/2012 |

OTHER PUBLICATIONS

International Search Report of PCT application No. PCT/JP2016/004811 dated Jan. 31, 2017.

* cited by examiner

*Primary Examiner* — Thomas G Black
*Assistant Examiner* — Demetra R Smith-Stewart
(74) *Attorney, Agent, or Firm* — Greenblum & Bernstein, P.L.C.

(57) ABSTRACT

A method for providing information concerning travel by public transportation to a user via a terminal device capable of acquiring a time and a position includes acquiring, from the terminal device, information indicating the user's alighting location, acquiring a departure time and a boarding location based on whether a traveling speed calculated from a first time and a first position and a second time and a (Continued)

second position acquired from the terminal device have exceeded a first threshold value, identifying a transportation service the user has boarded based on the departure time, the boarding location, and operation information, determining whether the identified transportation service stops at the alighting location acquired from the terminal device, and providing the user, via the terminal device, information indicating that this transportation service does not stop at the alighting location if it is determined that the transportation service does not stop at the alighting location.

18 Claims, 18 Drawing Sheets

(51) Int. Cl.
  *G06Q 50/30* (2012.01)
  *G08G 1/005* (2006.01)
  *G01C 21/34* (2006.01)
  *G08G 1/127* (2006.01)
  *G06Q 10/10* (2012.01)
(52) U.S. Cl.
  CPC .............. *G06Q 10/10* (2013.01); *G06Q 50/30* (2013.01); *G08G 1/005* (2013.01); *G08G 1/127* (2013.01)

FIG. 3

ROUTE A→Z

|   | AZ001 | AZ003 | AZ005 | ... |
|---|---|---|---|---|
| A | 06:00 | 06:15 | 06:30 | ... |
| B | 06:05 | 06:20 | 06:35 | ... |
|   | 06:06 | 06:21 | 06:36 | ... |
| ⋮ | ⋮ | ⋮ | ⋮ | ⋮ |
| Z | 07:12 | 07:27 | 07:43 | ... |

ROUTE Z→A

|   | ZA002 | ZA004 | ZA006 | ... |
|---|---|---|---|---|
| Z | 05:55 | 06:10 | 06:12 | ... |
| Y | 06:03 | 06:18 | PASS | ... |
|   | 06:04 | 06:21 | PASS | ... |
| ⋮ | ⋮ | ⋮ | ⋮ | ⋮ |
| A | 07:07 | 07:22 | 07:15 | ... |

ROUTE A→C

|   |   | AC001 | AC003 | AC005 | ... |
|---|---|---|---|---|---|
| A | E | 06:12 | 06:22 | 06:42 | ... |
| B | NE | 06:17 | PASS | 06:47 | ... |
|   |   | 06:18 | PASS | 06:48 | ... |
| ⋮ | ⋮ | ⋮ | ⋮ | ⋮ | ⋮ |
| C | — | 06:50 | 06:45 | 07:12 | ... |

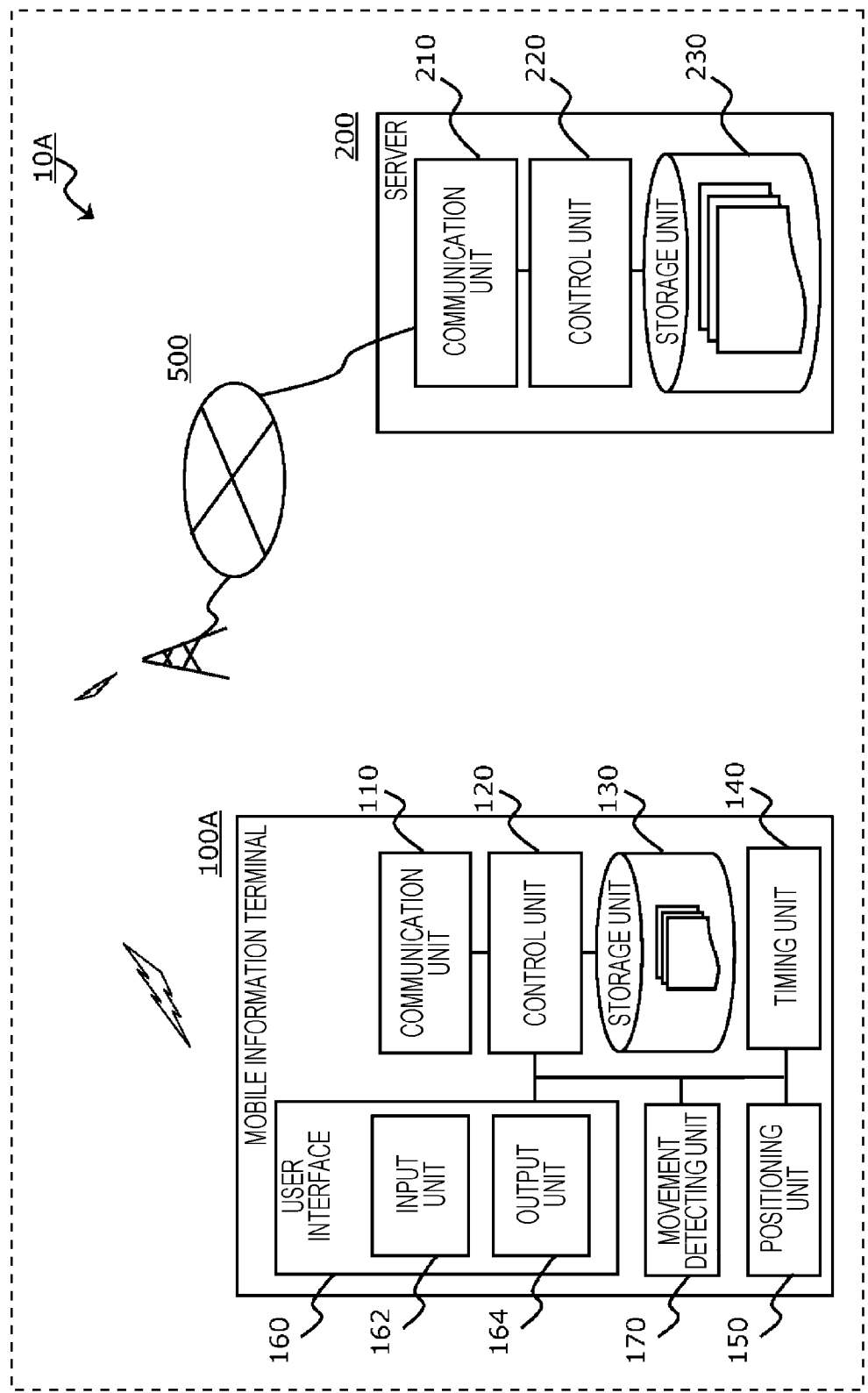

TRAVEL INFORMATION PROVIDING METHOD, TRAVEL INFORMATION PROVIDING APPARATUS, AND NON-TRANSITORY RECORDING MEDIUM

BACKGROUND

1. Technical Field

The present disclosure relates to techniques for providing users of mobile information terminals with information concerning travel by public transportation via the mobile information terminals.

2. Description of the Related Art

In recent years, a service that enables a user of a mobile information terminal, such as a smartphone, to look up information concerning travel to a destination by public transportation with his/her mobile information terminal, or in other words, a service (hereinafter, also referred to as a route guidance service) that enables the user to search for a method of traveling by public transportation, such as a train and a bus, is being used (hereinafter, also referred to as a route search). This information concerning travel includes, for example, information concerning available routes and an optimal route among the available routes, public transportation and the transportation services thereof, transfer locations, the time required, and the fares. Such a route guidance service is provided to the user via a map application program, an application program for the route search, or an application program for web browsing (hereinafter, also referred to simply as an application) on a mobile information terminal.

An example of processing procedures for providing this route guidance service is as follows. First, an application on a mobile information terminal receives an input of a destination from a user. Next, this application accesses the database of the route guidance service provider and acquires information concerning travel, such as those mentioned above, derived through a predetermined algorithm from the information of the destination, a current location, and so on. Lastly, this application presents the acquired information to the user on the mobile information terminal as a search result. In such a field, there is a technique for notifying a user that the user is on a wrong transportation service by using positioning information of the global positioning system (GPS) or the like acquired by the mobile information terminal (refer to Japanese Unexamined Patent Application Publication No. 2009-234345).

However, there are patterns for instances of taking a wrong transportation service that cannot be detected or that require some time to be detected with the technique disclosed in Japanese Unexamined Patent Application Publication No. 2009-234345.

SUMMARY

One non-limiting and exemplary embodiment provides a travel information providing method and so on for promptly determining whether a user traveling by public transportation is on a wrong transportation service.

In one general aspect, the techniques disclosed here feature a travel information providing method for providing a user with information concerning travel of the user by public transportation via an terminal device, and the terminal device is capable of acquiring a time and a position. The travel information providing method includes acquiring, from the terminal device, destination information indicating an alighting location of the user on the public transportation; acquiring first information and second information from the terminal device, the first information indicating a first time and a position of the terminal device at the first time, the second information indicating a second time and a position of the terminal device at the second time, the second time being later than the first time; acquiring, as a departure time of a transportation service of the public transportation that the user has boarded, a time at which a traveling speed of the terminal device has exceeded a first threshold value on the basis of the first information and the second information; acquiring, as a boarding location where the user has boarded the transportation service of the public transportation, a location where the traveling speed of the terminal device has exceeded the first threshold value on the basis of the first information and the second information; acquiring operation information indicating an operation schedule of the public transportation that runs in an operation route including the boarding location; identifying the transportation service that the user has boarded on the basis of the departure time, the boarding location, and the operation information; determining whether the transportation service that the user has boarded stops at the alighting location on the basis of the transportation service that the user has boarded, the alighting location, and the operation information; and providing the user with information indicating that the transportation service that the user has boarded does not stop at the alighting location via the terminal device in a case in which it is determined that the transportation service that the user has boarded does not stop at the alighting location.

In another general aspect, the techniques disclosed here feature a travel information providing method for providing a user traveling by public transportation with information concerning the travel via a terminal device, and the terminal device is capable of acquiring a time and a position. The travel information providing method includes acquiring, from the terminal device, destination information indicating an alighting location of the user on the public transportation; acquiring current information from the terminal device, the current information indicating a current time and a position of the terminal device at the current time; acquiring identification information for identifying a transportation service of the public transportation that the user boards from a transmitter of the public transportation that the user boards; acquiring operation information indicating an operation schedule of the public transportation; determining whether the transportation service that the user boards stops at the alighting location after the current time on the basis of the destination information, the current information, the identification information, and the operation information; and notifying the user, via the terminal device, that the transportation service that the user boards does not stop at the alighting location in a case in which it is determined that the transportation service that the user boards does not stop at the alighting location after the current time.

The travel information providing method and so on of the present disclosure can promptly determine whether a user traveling by public transportation is on a wrong transportation service and can provide the user with information concerning the travel on the basis of the result of the determination.

These general and specific aspects may be implemented using a system, a method, and a computer program, and any combination of systems, methods, and computer programs.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 illustrates an example of a data structure of operation information according to the first embodiment;

FIG. 6 is a block diagram illustrating a configuration of a travel information providing system according to a modification of the first embodiment;

DETAILED DESCRIPTION

Underlying Knowledge Forming Basis of the Present Disclosure

The present inventor has found that the technique described in the section titled "Description of the Related Art" faces the following problems.

Figure 1A:
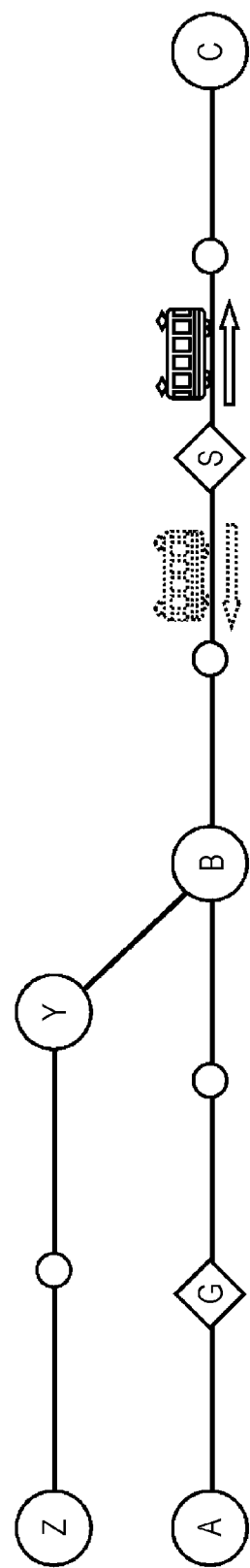
FIG. 1A illustrates one pattern for an instance of taking a wrong transportation service.
Figure 1B:
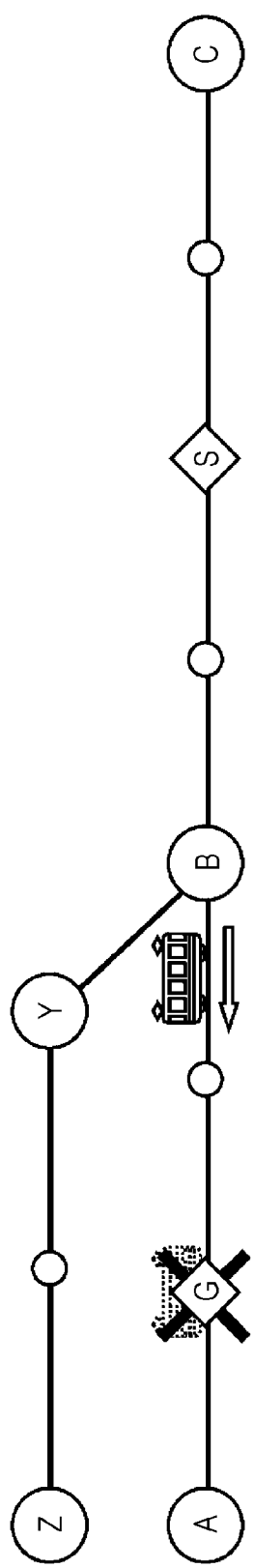
FIG. 1B illustrates another pattern for an instance of taking a wrong transportation service.
Figure 1C:
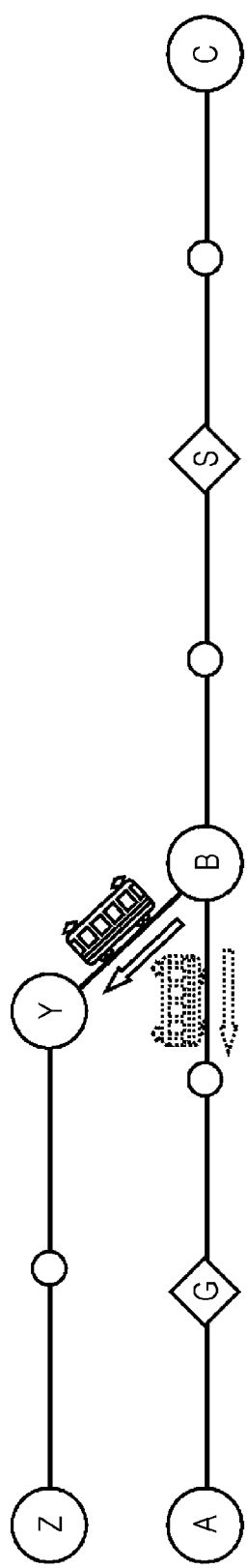
FIG. 1C illustrates yet another pattern for an instance of taking a wrong transportation service.

Three typical patterns for instances of taking a wrong transportation service can be considered. These patterns will be described with reference to FIG. 1A to FIG. 1C that schematically illustrate the respective patterns with trains and their routes being used as examples. Although a train is used as an example in this description, a similar instance of taking a wrong transportation service can also occur in other types of public transportation having preset routes. In FIG. 1A to FIG. 1C, circular figures and rectangular figures represents stations, lines connecting these figures represent railroads, and symbols A, B, C, Y, Z, S, and G represent the names of the stations. Among these, in the examples, the S station is a station where the user boards a train and departs, and the G station is a station of the destination where the user alights from the train. In addition, the graphics of trains and arrows depicted by solid lines indicate the positions and the traveling directions of the trains that the user has actually boarded, and the graphics of train and arrows depicted by dashed lines indicate the positions and the traveling directions of trains related to the intended travel of the user.

The pattern illustrated in FIG. 1A (hereinafter, referred to as a first pattern) is a case in which the user boards a train that travels in a direction different from the intended direction. In the example illustrated in FIG. 1A, although the user should have boarded a train that travels toward the B station from the S station in order to go to the G station, the user has boarded a train that travels toward the C station located in the opposite direction.

The pattern illustrated in FIG. 1B (hereinafter, referred to as a second pattern) is a case in which the type of the train (local, express, etc.) is inappropriate. In the example illustrated in FIG. 1B, although the user should have boarded a train that stops at the G station, the user has boarded a train that does not stop between the B station and the A station.

The pattern illustrated in FIG. 1C (hereinafter, referred to as a third pattern) is a case in which the user boards a train that travels onto a line that does not include the destination from a forthcoming junction. In the example illustrated in FIG. 1C, although the user should have boarded a train that travels toward the A station past the B station at the junction in order to go to the G station, the user has boarded a train that travels on a line that does not include the G station.

In the technique described above, the first pattern for an instance of taking a wrong transportation service can be detected in a relatively short period of time upon the user having boarded the vehicle.

However, in the second pattern for an instance of taking a wrong transportation service, since the route of the vehicle that the user has boarded is correct, the propriety of the vehicle cannot be determined on the basis of the positioning data.

In addition, the third pattern for an instance of taking a wrong transportation service can be detected only after the vehicle has passed the junction. However, if the user can notice that the user has taken a wrong transportation service prior to passing the B station, the user could have transferred to another train at the B station. When this is achieved, an influence of taking a wrong transportation service on the travel can be minimized.

In this manner, the problem remains in that there is an instance of taking a wrong transportation service that cannot be detected. In addition, when a user takes a wrong transportation service, the more time it passes after that instance occurs, the greater the geographical or temporal separation tends to be from the target travel that the user has intended. In other words, the technique described above faces a problem in that the delayed detection of an instance of taking a wrong transportation service cannot reduce its influence on the travel.

In order to solve the above problem, a travel information providing method according to an aspect of the present disclosure is a method for providing a user with information concerning travel of the user by public transportation via a terminal device, and the terminal device is capable of acquiring a time and a position. The travel information providing method includes acquiring, from the terminal device, destination information indicating an alighting location of the user on the public transportation; acquiring first information and second information from the terminal device, the first information indicating a first time and a position of the terminal device at the first time, the second information indicating a second time and a position of the terminal device at the second time, the second time being later than the first time; acquiring, as a departure time of a transportation service of the public transportation that the user has boarded, a time at which a traveling speed of the terminal device has exceeded a first threshold value on the basis of the first information and the second information; acquiring, as a boarding location where the user has boarded the transportation service of the public transportation, a location where the traveling speed of the terminal device has exceeded the first threshold value on the basis of the first information and the second information; acquiring operation information indicating an operation schedule of the public transportation that runs in a operation route including the boarding location; identifying the transportation service that the user has boarded on the basis of the departure time, the boarding location, and the operation information, determining whether the transportation service that the user has boarded stops at the alighting location on the basis of the transportation service that the user has boarded, the alighting location, and the operation information; and providing the user with information indicating that the transportation service that the user has boarded does not stop at the alighting location via the terminal device in a case in which it is determined that the transportation service that the user has boarded does not stop at the alighting location.

With this, upon being detected that the user carrying the mobile information terminal has started traveling by public transportation, it is determined promptly whether the transportation service that the user has boarded stops at an alighting location intended by the user. Thus, in a case in which the transportation service that the user has boarded does not stop at the alighting location, the information to that effect is provided to the user promptly. Furthermore, the above-described determination is not made until the user starts traveling by public transportation. Thus, an occurrence of an erroneous notification can be prevented, and the reliability of the information provided with regard to the travel can be ensured more reliably.

For example, the terminal device may include a sensor that detects a movement of the terminal device and outputs information indicating the detected movement, and it may be determined that the user has boarded a transportation service of the public transportation in a case in which the movement of the terminal device detected between the first time and the second time as indicated by the output information falls below a second threshold value.

With this, the determination as to whether the user has started traveling by boarding a vehicle of the public transportation can be made with higher accuracy. Thus, an occurrence of an erroneous notification can be prevented, and a decrease in the user's reliability on the information provided with regard to the travel can be prevented.

For example, information indicating that the user needs to board a transportation service that runs on a route different from that of the transportation service that the user has boarded may be provided to the user via the terminal device in a case in which the operation information indicates that the transportation service that the user has boarded stops at a junction location past the boarding location, the operation information indicates that the transportation service that the user has boarded does not stop at the alighting location past the boarding location, and the operation information indicates that the junction location is present between the boarding location and the alighting location.

With this, the information concerning a transfer location where the user transfers to a transportation service that stops at the alighting location is provided to the user. On the basis of this information, the user can once alight at the transfer location and take an action for transferring to a transportation service on a different route.

For example, in a case in which it is determined that the transportation service that the user has boarded does not stop at the alighting location, third information may be acquired from the terminal device, the third information indicating a third time and a position of the terminal device at the third time; a transfer location for the user to transfer from the transportation service that the user has boarded may be identified on the basis of the third information and the operation information, the transportation service that the user has boarded stopping at the transfer location past the boarding location; a transportation service that stops at the alighting location past the transfer location and that departs from the transfer location at a time later than a time at which the transportation service that the user has boarded arrives at the transfer location may be identified on the basis of the third information, the operation information, the transfer location, and the alighting location; and information indicating the transfer location and the transportation service of the public transportation that runs on the identified route may further be provided to the user via the terminal device.

With this, the user who has boarded the transportation service that does not stop at the alighting location can be provided with specific information concerning the travel for arriving at the desired destination from the current situation, in addition to the information indicating that the user has boarded the transportation service that does not stop at the alighting location.

For example, the terminal device may include a display that emits light or displays a letter or a graphic, and that the transportation service that the user has boarded does not stop at the alighting location may be displayed on the display.

With this, the user can visually receive the information that supports the target travel.

For example, the terminal device may include a vibrator that vibrates the terminal device, and the terminal device may be vibrated in a first pattern by the vibrator in a case in which it is determined that the transportation service that the user has boarded does not stop at the alighting location. In addition, the terminal device may be vibrated in a second pattern by the vibrator in a case in which it is determined that the transportation service that the user has boarded stops at the alighting location, the second pattern being different from the first pattern.

With this, the user can be notified as to whether the transportation service that the user has boarded stops at the alighting location by attracting the user's attention even when the user is not looking at the screen of the mobile information terminal.

For example, in a case in which it is determined that the transportation service that the user has boarded stops at the alighting location, third information may be acquired from the terminal device, the third information indicating a third time and a position of the terminal device at the third time, the third time being later than the second time; the position of the terminal device indicated by the third information may be compared with a position of the alighting location; and the user may be notified, via the terminal device, that the transportation service that the user has boarded is about to arrive at the alighting location in a case in which the position of the terminal device indicated by the third information is within a predetermined distance from the alighting location.

With this, the user who is traveling by the vehicle can be prevented from missing the alighting location.

For example, the terminal device may include a first terminal device and a second terminal device; the first terminal device may include an input for the user to input the alighting location; the second terminal device may include at least one of a display that emits light or displays a letter or a graphic and a vibrator that vibrates the second terminal device; and in a case in which it is determined that the transportation service that the user has boarded does not stop at the alighting location, that the transportation service that the user has boarded does not stop at the alighting location may be displayed on the display, and the second terminal device may be vibrated by the vibrator.

With this, the information can be presented to the user who carries a plurality of mobile information terminals but cannot receive information from some of the mobile information terminals via the remaining mobile information terminals.

In addition, for example, the second terminal device may be a wearable terminal.

With this, the information can be presented, for example, to the user who is in a situation in which the user cannot look at a smartphone by holding it in hands via a smartwatch or the like that the user is wearing.

In addition, for example, the first terminal device may receive fourth information indicating that the transportation service that the user has boarded does not stop at the alighting location in a case in which it is determined that the transportation service that the user has boarded does not stop at the alighting location; and the first terminal device may transmit at least one of a first command and a second command to the second terminal device, the first command causing the display to display that the transportation service that the user has boarded does not stop at the alighting location, the second command causing the vibrator to vibrate the second terminal device.

With this, the information indicating that the transportation service that the user has boarded does not stop at the alighting location may be provided, for example, to the user who is in a situation in which the user cannot look at a smartphone by holding it in hands with the use of a letter or an icon displayed on a screen of a smartwatch or the like that the user is wearing, or such a user can be notified that such information is present through vibration.

In addition, a travel information providing method according to an aspect of the present disclosure is a method for providing a user traveling by public transportation with information concerning the travel via a terminal device, and the terminal device is capable of acquiring a time and a position. The travel information providing method includes acquiring, from the terminal device, destination information indicating an alighting location of the user on the public transportation; acquiring current information from the terminal device, the current information indicating a current time and a position of the terminal device at the current time; acquiring identification information for identifying a transportation service of the public transportation that the user boards from a transmitter of the public transportation that the user boards; acquiring operation information indicating an operation schedule of the public transportation; determining whether the transportation service that the user boards stops at the alighting location after the current time on the basis of the destination information, the current information, the identification information, and the operation information; and notifying the user, via the terminal device, that the transportation service that the user boards does not stop at the alighting location in a case in which it is determined that the transportation service that the user boards does not stop at the alighting location after the current time.

With this, it is determined promptly whether the transportation service that the user has boarded or the transportation service that is in front of the user stops at the alighting location of the user before the user carrying the mobile information terminal starts traveling by the public transportation. Thus, in a case in which the stated transportation service does not stop at the alighting location of the user, such information is presented to the user promptly. Furthermore, since information provided by the public transportation is used to identify the transportation service that the user is to use for the travel, an occurrence of an erroneous notification can be prevented, and the reliability of the information provided with regard to the travel can be ensured more reliably.

In addition, for example, the terminal device may include a receiver for visible light communication, the identification information may be represented by a visible light communication signal, and the identification information may be acquired via the receiver.

With this, in order for the user to receive the light emitted by the transmitter, the user needs to take an intentional action, such as directing the mobile information terminal toward the vehicle. Therefore, even in a case in which some vehicles are close to each other or some boarding locations are close to each other, the user can selectively acquire information concerning the intended vehicle or the transportation service that departs from the intended boarding location.

Hereinafter, embodiments will be described in concrete terms with reference to the drawings.

It is to be noted that general or specific aspects of the embodiments may be implemented in the form of a system, a method, an integrated circuit, a computer program, or a computer-readable recording medium, such as a CD-ROM, or through a desired combination of a system, a method, an integrated circuit, a computer program, and a recording medium. In addition, a part or all of the disclosures of the descriptions may be combined with a different embodiment.

First Embodiment

1. Configuration

First, a travel information providing system 10 for executing a method of presenting information concerning travel of a user by public transportation (hereinafter, referred to as a travel information providing method) will be described. Although trains are used as examples in some cases in the description of the present embodiment, the travel information providing method according to the present embodiment can also be applied to another type of public transportation that runs on a predetermined route and can also be applied to travel by a plurality of types of public transportation.

Figure 2:
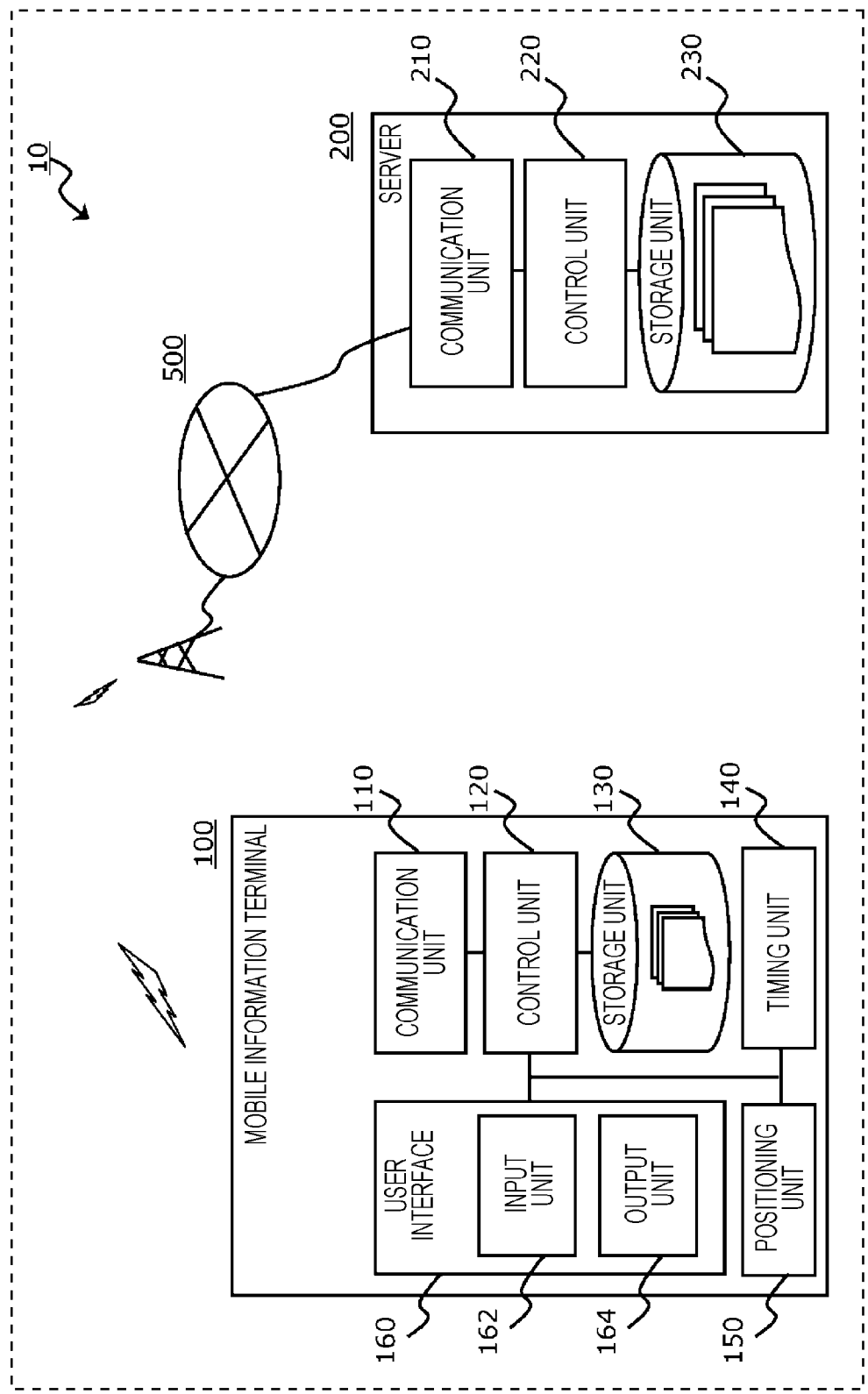
FIG. 2 is a block diagram illustrating a configuration of a travel information providing system according to a first embodiment.

FIG. 2 is a block diagram illustrating a configuration of the travel information providing system 10 for executing the travel information providing method according to the present embodiment.

In the travel information providing system 10, a mobile information terminal 100 and a server 200 are connected so as to be capable of communicating with each other via a communication circuit 500, such as the internet.

The mobile information terminal 100 is a terminal device carried by a user who travels by public transportation. The mobile information terminal 100 may be implemented, for example, by an information terminal that the user typically uses while holding it in hands (hereinafter, also referred to as a non-wearable type), such as a smartphone or a tablet computer, a terminal device that the user typically uses while wearing it on the body (hereinafter, also referred to as a body wearable type), such as a smartwatch, a smart bracelet, a smart ring, or a smart glass, or a combination thereof. For example, in a case in which one user carries a smartphone and also wears a smartwatch, these terminal devices may cooperate and function as the mobile information terminal 100. This cooperation will be described later with an example.

The mobile information terminal 100 includes, as constituent elements, a communication unit 110, a control unit 120, a storage unit 130, a timing unit 140, a positioning unit 150, and a user interface 160.

The communication unit 110 is a wireless communication module or the like that supports a predetermined communication protocol and implements an exchange of data with the server 200 via a circuit, such as the internet. In addition, in a case in which a plurality of terminal devices cooperate and function as the mobile information terminal 100 as described above, the communication among the plurality of terminal devices is also implemented by the communication unit 110. It is to be noted that the communication protocol used in the communication with the server 200 may differ from the communication protocol used in the communication with another terminal device. In other words, the communication unit 110 may be a communication module that supports a plurality of communication protocols or may be a plurality of communication modules that support different communication protocols. It is to be noted that the party with which the mobile information terminal 100 communicates is not limited to the server 200, and the mobile information terminal 100 may acquire information, for example, from a server (not illustrated) of public transportation via a circuit, such as the internet.

The control unit 120, for example, executes an application called through a user instruction and controls other constituent elements in accordance with this application or an operation system of the mobile information terminal 100. The other constituent elements operate under the control of the control unit 120.

The storage unit 130 is a non-transitory storage device that stores the operation system of the mobile information terminal 100 and various applications installed by the user and is implemented by a storage medium, such as a flash memory. The aforementioned various applications are stored in the storage unit 130 and are executed by the control unit 120 upon being called by the user or by another application.

In addition, the storage unit 130 may also store data that is referred to by these applications. Examples of such data include the history of route searches, the operation information of public transportation, and map data. The operation information will be described in detail in the description of the server 200.

FIG. 3 illustrates an example of a data structure of the operation information. In this example, the operation information is data in a format similar to that of a so-called timetable for each route and indicates the operation schedule of the public transportation (the operation schedule of each transportation service). Each table shows the names (AZ001, ZA002, etc.) for identifying the transportation services in the uppermost row and the names for identifying the stopping locations (A, B, etc.) in the leftmost column. In other words, the leftmost column in each table indicates an operation route of the train or the bus service operated by the public transportation. Each of the cells where these rows and columns intersect contains the time or the character string "PASS" indicating that the transportation service passes the stopping location. In this manner, the stopping location in the row including the cell that contains information indicating the passage instead of the numerical value indicating the time may be acquired as a passing location of the transportation service indicated by that row. The times indicated for each stopping location include the arrival time in the upper row and the departure time in the lower row. However, only the departure time is indicated at the origin of each transportation service, and only the arrival time is indicated at the last stop of each transportation service. In addition, the traveling direction may be indicated by the title of each table (e.g., "route A→Z"), or a separate piece of information may be used. For example, the traveling direction may be indicated by using a predetermined region or the like of each transportation service (area name or up/down) or may be indicated by using the direction from each stopping location toward its next stopping location. In the operation information of the route bound for C from A (lowermost table) illustrated in FIG. 3, the direction from each stopping location toward its next stopping location is indicated by a symbol in the column to the right of the names of the stopping locations. In addition, a stopping location and a passing location past each stopping location may be used as the information indicating the traveling direction. For example, the correctness of the traveling direction of a vehicle that the user has boarded may be determined on the basis of whether the alighting location for the destination of the user is included in the stopping locations or the passing locations of the transportation service that user has boarded past the location where the user has boarded the vehicle. It is to be noted that this data structure is merely an example, and the operation information of the present embodiment may have a data structure different from that of this example. For example, the transportation services, the departure and arrival times, the stopping locations, the passing locations, and so on may be indicated in other formats. For example, information indicating the types of the transportation services, such as local or express, may be further included, and the passing location of each transportation service may be identified with reference to another table on the basis of the stated types. In addition, the time of passage at each passing location may further be indicated.

The timing unit 140 is a built-in clock implemented by hardware, software, or a combination thereof included in the mobile information terminal 100 and can acquire the current time. The current time acquired by the timing unit 140 is passed to the control unit 120 and is used in the processing in the travel information providing system 10. The details of this use will be described later.

The positioning unit 150 is, for example, a GPS reception module and can acquire the current geographical location of the mobile information terminal 100 (indirectly, the current geographical location of the user carrying the mobile information terminal 100) on the basis of a signal received from a GPS satellite. It is to be noted that the method of acquiring the current location is not limited to a method that uses a signal from a GPS satellite, and the current location may be acquired on the basis of the positional information of an access point of Wi-Fi (registered trademark) to which the mobile information terminal 100 is currently connected, for example. The current location acquired by the positioning unit 150 is passed to the control unit 120 and is used in the processing in the travel information providing system 10. The details of this use will be described later.

The user interface 160, which is constituted by an input unit 162 and an output unit 164, is an interface between the mobile information terminal 100 and the user of the mobile information terminal 100. The user interface 160 receives an input of an instruction and data for each application from the user via the input unit 162 and presents information to the user via the output unit 164.

Examples of the input unit 162 include a touch sensor such as a touch panel, various buttons and keys, and a microphone.

The output unit 164 presents information to the user in a form that can be perceived through a visual sensation, an auditory sensation, a tactile sensation, or a combination thereof. Examples of the output unit 164 include a display, an indicator light, a speaker, an external sound output unit, and a vibrator. A vibrator may be able to vibrate the mobile information terminal 100 in a plurality of patterns that differ in terms of the intensity, the rhythm, the duration, or the like under the control of the control unit 120. An indicator light may be able to emit light in a plurality of patterns that differ in terms of the color, the rhythm of turning on/off or blinking, or the like under the control of the control unit 120. It is to be noted that, of the examples of the output unit 164, a display and an indicator light are collectively referred to as a display, or no particular distinction is made therebetween, hereinafter.

The operation of the mobile information terminal 100 implemented as these constituent elements operate will be described in the description of the travel information providing method in the later sections.

The server 200 is a server device constituted by one or a plurality of computers for presenting information concerning travel to the user. The server 200 carries out predetermined processing on the basis of data received from the mobile information terminal 100 via the communication circuit 500 and transmits data resulting from the processing to the mobile information terminal 100 via the communication circuit 500.

The server 200 includes, as constituent elements, a communication unit 210, a control unit 220, and a storage unit 230.

The communication unit 210 is a wired or wireless communication module or the like that supports a predetermined communication protocol and implements an exchange of data with the mobile information terminal 100 via a circuit, such as the internet. In a case in which a plurality of server computers function as the server 200 as described above, the communication among the plurality of server computers is also implemented by the communication unit 210. The communication protocol used in the communication with the mobile information terminal 100 may differ from the communication protocol used in the communication with another server computer. In other words, the communication unit 210 may be a communication module that supports a plurality of communication protocols or may be a plurality of communication modules that support different communication protocols. It is to be noted that the party with which the server 200 communicates is not limited to the mobile information terminal 100, and the server 200 may acquire necessary information, for example, from a server (not illustrated) of public transportation via a circuit, such as the internet.

The control unit 220 executes an application installed on the server 200 to execute the processing described above and controls the other constituent elements in accordance with this application or the operation system of the server 200. The other constituent elements operate under the control of the control unit 220.

The storage unit 230 is a non-transitory storage device that stores the operation system of the server 200 and various applications installed on the server 200 and is implemented, for example, by a storage medium, such as a flash memory or a hard disk drive. The application for providing the service of presenting information concerning travel described above is stored in the storage unit 230 and is executed by the control unit 220.

In addition, the storage unit 230 further stores data that is referred to by the server 200 or the application on the mobile information terminal 100. Examples of such data include the operation information of public transportation and map data.

The operation information indicates the stopping locations of each transportation service of the public transportation and the departure and arrival times at each stopping location. However, the content of the information indicated by the operation information is not limited to the above. For example, the operation information may further indicate the traveling direction of each transportation service (hereinafter, also referred to as a vehicle traveling direction) and passing locations of each transportation service (stations, bus stops, and so on that each transportation service passes).

It is to be noted that the operation information or the map data do not need to be stored in both the storage unit 130 and the storage unit 230. In particular, the capacity constraint of the storage unit 130, which is the storage unit of the mobile information terminal, is stricter than that of the storage unit 230, and thus some data may not be suitable for being stored in the storage unit 130 depending on the data size. In such a case, the mobile information terminal 100 may, for example, transmit information acquired through a user input or the like to the server 200 as a search key and may receive, from the server 200, the operation information necessary for each instance of processing as a result for the search key. In other words, it suffices that the data referred to by each application be accessible in the travel information providing system 10 as a whole, and the location of the data is not limited. In addition, it suffices that the functional module of each application, excluding the interface with the user, be accessible in the travel information providing system 10 as a whole, and the location of the functional module is not limited.

It is to be noted that, as long as the operation information of at least an area necessary for presenting the travel information is stored in the storage unit 130 of the mobile information terminal 100, the mobile information terminal 100 may provide a route guidance service to the user regardless of the communication status with the server 200. In other words, the information providing method concerning travel by public transportation implemented by the travel information providing system 10 described hereinafter may be implemented by the mobile information terminal 100 alone. In addition, whether the mobile information terminal 100 implements this method by communicating with the server 200 or the mobile information terminal 100 alone implements this method (while being so-called offline) may be switched therebetween on the basis of the communication status or as desired by the user. Hereinafter, the mobile information terminal 100 will be described on the assumption that the operation information is stored in the storage unit 230 of the server 200 and the mobile information terminal 100 can communicate with the server 200.

The operation of the server 200 implemented as these constituent elements operate will be described in the description of the travel information providing method in the later sections.

2. Method of Providing Travel Information

Next, the travel information providing method according to the present embodiment will be described along with an example of the operation of the above-described travel information providing system 10 that implements the travel information providing method.

Figure 4A:
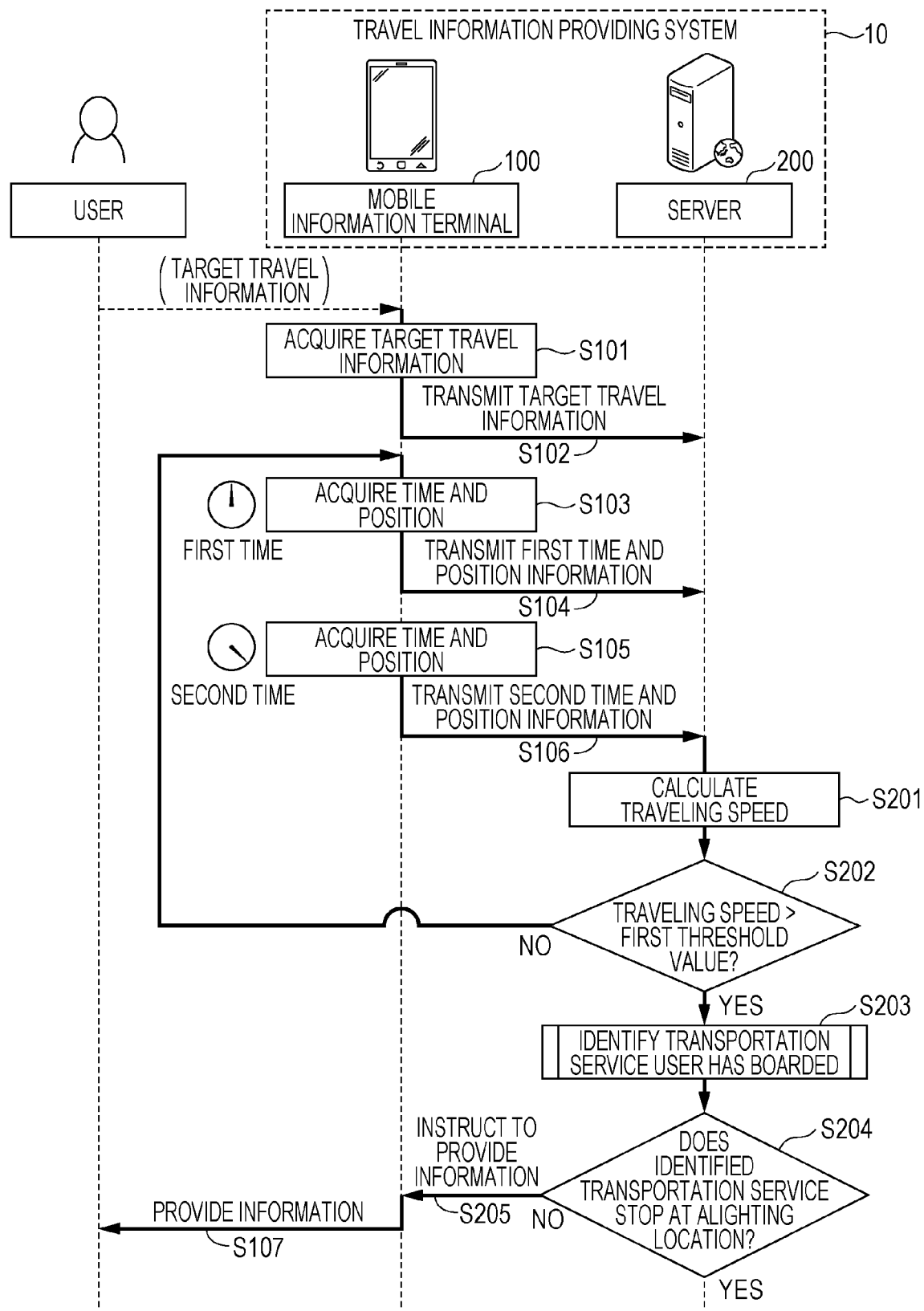
FIG. 4A illustrates a flow of a travel information providing method according to the first embodiment along with data used in an operation of a travel information providing system and the movement of the data.

FIG. 4A illustrates a flow of the travel information providing method according to the present embodiment along with the data used in the operation of the travel information providing system 10 that implements the stated method and the movement of the data.

First, the mobile information terminal 100 acquires target travel information, which is the information concerning travel intended by the user who travels by boarding a vehicle of public transportation (step S101).

This target travel information may be acquired as the user inputs the target travel information into the mobile information terminal 100 via the input unit 162. In addition, the target travel information may be derived from information such as the destination input by the user by a route guidance application by referring to database including the operation information and so on, and the target travel information may be acquired as the route guidance information to be presented to the user. This target travel information includes at least destination information, which is the information indicating the location where the user alights from a vehicle (station, bus stop, etc., also referred to as an alighting location, hereinafter). In addition, the target travel information may further indicate the location where the user boards a vehicle (station, bus stop, etc., also referred to as a boarding location, hereinafter) and the traveling direction of the vehicle (e.g., the region or the direction predetermined for each transportation service of the vehicle or a stopping location in the traveling direction, also referred to as a target travel direction, hereinafter). In addition, in a case in which the user transfers to another vehicle or makes a connection to another vehicle prior to arriving at the destination, the target travel information may indicate the station, the bus stop, and so on for the transfer or the connection (transfer location or connection location). In addition, the target travel information may include, in addition to the above, information concerning an individual transportation service of the vehicle with the transportation service name, such as the scheduled departure time, the scheduled arrival time, and the type (local, express, etc.).

The mobile information terminal 100 transmits the acquired target travel information to the server 200 (step S102).

Next, the mobile information terminal 100 acquires a first time and the position of the mobile information terminal 100 at the first time (step S103) and transmits first time and position information indicating the aforementioned time and position to the server 200 (step S104). The first time and position information is an example of first information of the present disclosure.

Next, the mobile information terminal 100 acquires a second time and the position of the mobile information terminal 100 at the second time when a predetermined period of time, for example, several seconds to several tens of seconds has passed since the first time (step S105) and transmits second time and position information indicating the aforementioned time and position to the server 200 (step S106).

The server 200 that has acquired these pieces of information from the mobile information terminal 100 calculates the distance between the positions and the difference between the times indicated by the first time and position information and the second time and position information and calculates the traveling speed of the user carrying the mobile information terminal 100, or specifically, calculates the traveling speed of the mobile information terminal 100 (step S201).

Next, the server 200 uses this traveling speed in order to determine whether the user has boarded a vehicle and has started traveling. To be more specific, the server 200 compares the magnitude of the traveling speed calculated in step S201 with a predetermined threshold value (step S202). This predetermined threshold value is set so as to enable the server 200 to determine that user is not traveling on foot, by running, by a moving sidewalk, by an escalator, or the like but traveling by public transportation. For example, the predetermined threshold value may be set to approximately 25 km/h in consideration of the speeds of various means of traveling other than public transportation, such as the speed of a typical adult in a short-distance race (approximately 20 km/h), the speed of a moving sidewalk or an escalator (several kilometers per hour), and the speed of an electrically powered wheelchair (several kilometers per hour). It is to be noted that the predetermined threshold value used in the determination in step S202 is not limited to 25 km/h and may be set to a value appropriate for determining that the user is traveling by a vehicle of public transportation. This predetermined threshold value is also referred to as a first threshold value, hereinafter.

If the traveling speed of the mobile information terminal 100 is no greater than the first threshold value (NO in step S202), the server 200 acquires subsequent first time and position information and second time and position information from the mobile information terminal 100 and executes step S201 and step S202 again. In step S201 in the second and subsequent iterations, either of the first time and position information and the second time and position information used in step S201 in the previous iterations may be used as the first time and position information in step S201 in a new iteration.

Figure 4B:
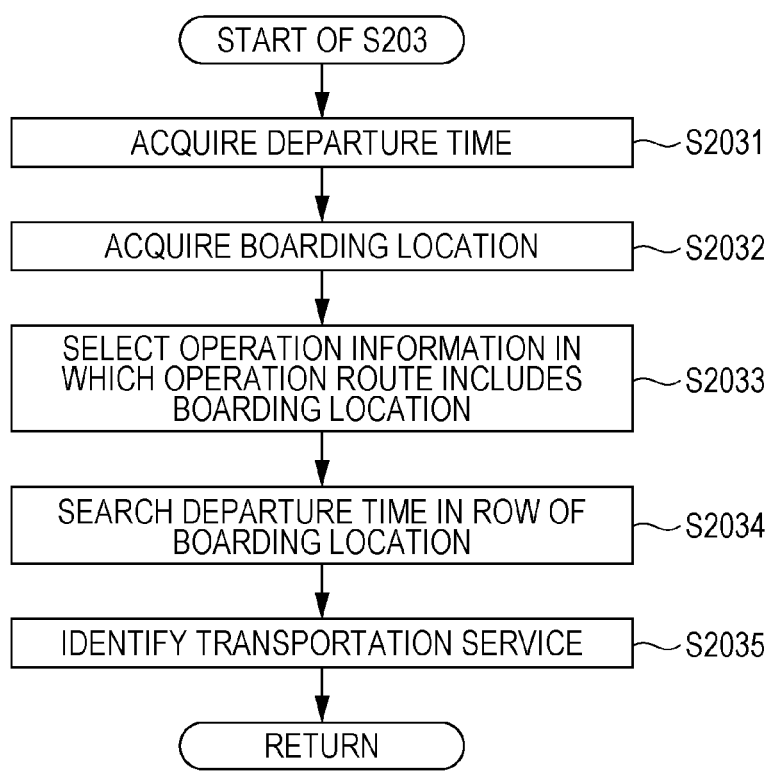
FIG. 4B is a flowchart illustrating an example of processing for identifying a transportation service that a user has boarded in the travel information providing method according to the first embodiment.

If the traveling speed of the mobile information terminal 100 exceeds the first threshold value (YES in step S202), the server 200 identifies the transportation service of the public transportation that the user has boarded (step S203). The processing executed by the server 200 in order to identify the transportation service will be described with an example. FIG. 4B is a flowchart illustrating an example of the processing for identifying the transportation service that the user has boarded in the travel information providing method according to the first embodiment. In this example, one or both of the first time and position information and the second time and position information used to calculate the traveling speed on which the determination of YES has been made in step S202 and the operation information illustrated in FIG. 3 are used.

First, the server 200 calculates and acquires the time at which the traveling speed of the mobile information terminal 100 has exceeded the first threshold value on the basis of the first time and position information and the second time and position information and uses the calculated time as the departure time (step S2031). In addition, the server 200 calculates and acquires the location where the traveling speed of the mobile information terminal 100 has exceeded the first threshold value on the basis of the first time and position information and the second time and position information and uses the calculated location as the boarding location (step S2032).

Next, the server 200 refers to the row that indicates the operation routes in the table of the operation information to determine whether the acquired boarding location is included in the operation routes and selects the table of the operation information that includes the acquired boarding location. Next, the server 200 searches the row of the boarding location in the selected table of the operation information for the time that is the same as the acquired departure time or the time that precedes and is as close as possible to the acquired departure time (step S2034). The name of the transportation service in the uppermost row of the column that includes the time found through the search is the name of the transportation service that the user has boarded, and this column indicates the operation schedule of this transportation service. In this manner, the server 200 identifies the portion of the operation information that includes the information on the operation schedule of the transportation service that the user has boarded on the basis of the departure time, the boarding location, and the operation information (step S2035).

In a case in which there are a plurality of candidates for the transportation service that the user has boarded, the candidates may be narrowed down by using the first time and position information, the second time and position information, or the information indicated by the operation information, such as the routes.

In addition, in another example of the method of identifying the transportation service that the user has boarded, the first time and position information and the second time and position information may be used as-is. This method will be described with an example of a case in which the operation information illustrated in FIG. 3 is used again. First, the assumption is as follows. The first time and position information indicates the first time of 06:16:20 and a first position of a position between the A station and the B station, and the second time and position information indicates the second time of 06:17:15 and a second position of a position that is between the A station and the B station and that is closer to the B station than the first position is. In this case, the server 200 refers to the operation information illustrated in FIG. 3 and searches for a transportation service of which the time at the A station is earlier than the first time and the time at the B station is later than the second time. In this example, the transportation service AZ003 is the transportation service that meets this condition and is identified as the transportation service that the user has boarded. Although the transportation service AC001 is also a possible candidate if the determination is made only on the basis of the first time and position information in this example, the transportation service AC001 is excluded from the candidates because the second time is past the time of the transportation service AC001 at the B station. Alternatively, that the second location in not past the B station (closer to the A station) may also be taken into consideration.

Next, the server 200 determines whether the transportation service that the user has boarded stops at the alighting location intended by the user on the basis of the transportation service identified in step S203, the target travel information acquired in step S102, and the operation information (step S204). For example, the server 200 refers to the operation information and determines that the identified transportation service stops at the alighting location in a case in which the operation information indicates that the transportation service identified in step S203 stops at the alighting location indicated by the destination information past the boarding location acquired in step S2032.

It is to be noted that the determination in step S204 is not limited to the above. For example, in a case in which the target travel information indicates the target travel direction and the operation information indicates the vehicle traveling direction, the determination may be made on the basis of the difference between the target travel direction and the vehicle traveling direction.

This determination based on the directions in step S204 will be described with an example of a case in which the user uses the lines indicated in FIG. 1A to FIG. 1C. The assumption is that the user intends to travel from the S station to the G station. In this case, in a case in which the target travel information acquired by the server 200 on the basis of the information input by the user indicates "toward the A station" as the target travel direction and the traveling direction of the transportation service that the user has boarded indicated by the operation information is "toward the C station," it is determined that the transportation service that the user has boarded does not stop at the alighting location intended by the user. It is to be noted that the target travel direction and the vehicle traveling direction may be indicated by using the direction of the traveling direction from each stopping location of each transportation service or a stopping location and a passing location in the traveling direction, as described above.

If it is determined that the transportation service that the user has boarded does not stop at the alighting location intended by the user (NO in step S204), the server 200 transmits, to the mobile information terminal 100, an instruction directing that the information be provided to the user (hereinafter, also referred to as an information providing instruction and is an example of fourth information of the present disclosure) (step S205). The mobile information terminal 100 that has received this instruction presents predetermined information to the user via the output unit 164 of the user interface 160 (step S107). With this, the server 200 notifies the user that the transportation service that the user has boarded does not stop at the alighting location intended by the user via the mobile information terminal 100.

Figure 5A:
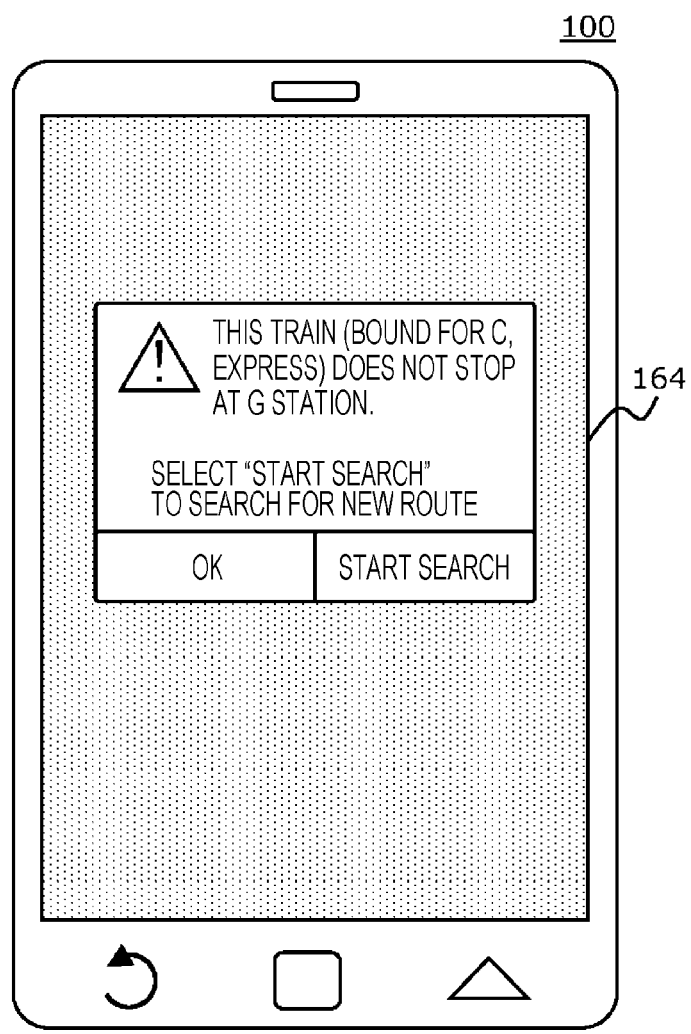
FIG. 5A illustrates an example of a screen that presents information in a case in which the travel of the user is not appropriate in the first embodiment.
Figure 5B:
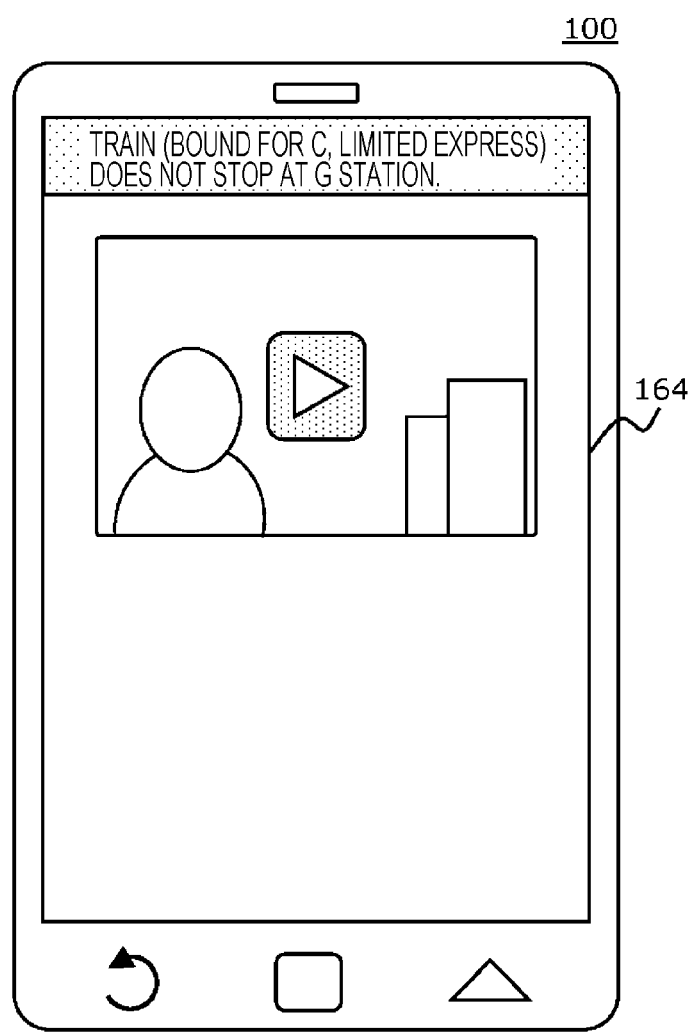
FIG. 5B illustrates another example of a screen that presents information in a case in which the travel of the user is not appropriate in the first embodiment.

The server 200 may, for example, provide the user with specific information by displaying letters, graphics, and so on on a display of the mobile information terminal 100, such as a smartphone, that includes the display serving as the output unit 164. FIG. 5A and FIG. 5B each illustrate an example of the screen displayed on the mobile information terminal 100 by the server 200 in a case in which the transportation service that the user has boarded does not stop at the alighting location intended by the user according to the present embodiment. FIG. 5A illustrates an example of the screen displayed when the user prompted by a notification through vibration or light emission described above sees the display of the mobile information terminal 100. FIG. 5B illustrates an example of the screen displayed on the mobile information terminal 100 by the server 200 when the user is already seeing something on the display of the mobile information terminal 100. FIG. 5B illustrates a state in which the character string scrolls on the upper portion of the screen. It is to be noted that the information concerning the travel presented to the user as illustrated in FIG. 5A and FIG. 5B is an example, and the wording and the content of the information included in the display and the position, the size, and so on of the display are not limited to this example as long as the display can support the travel of the user thereafter.

In order to enable the user to arrive at the destination while suppressing a waste of time and money as much as possible, it is desirable to cause the user to notice that there is a notification as early as possible. Therefore, the notification may be provided in a mode that can attract attention of the user who is not paying attention to the propriety of his/her travel. For example, in a case in which the mobile information terminal 100 is provided with a vibrator and has a vibration function, the mobile information terminal 100 may be vibrated in a predetermined pattern (the intensity, the rhythm, the duration, etc., or a combination thereof) as in a case in which a call is received on a mobile phone. In addition, for example, in a case in which the mobile information terminal 100 is provided with an indicator light, this indicator light may be turned on/off or caused to blink in a predetermined pattern (the color, the rhythm, etc., or a combination thereof). The vibration and the light emission may each be used alone or may be used in combination. For example, the notification may be provided as the mobile information terminal is being vibrated for a predetermined period of time and, while the mobile information terminal 100 is being vibrated or after the mobile information terminal 100 is vibrated, the indicator light may be turned on/off or caused to blink until the user operates the mobile information terminal 100 in a certain way.

In addition, such a notification through the vibration or the light emission may be executed in the mobile information terminal 100 of a body wearable type, such as a smartwatch, that is not provided with a display serving as the output unit 164 or that is provided with a relatively small display. For example, the smartwatch may be vibrated, or the indicator light provided in the smartwatch may be turned on/off or caused to blink. If the smartwatch is worn on the wrist of the user that holds a hand strap, the user notices the indicator light more easily, and the information concerning the travel can be provided to the user more reliably.

In addition, the mobile information terminal 100 may be constituted by a combination of a plurality of terminal devices, and the plurality of terminal devices may cooperate to execute the presentation of the information in step S107. In a case in which the mobile information terminal 100 is constituted by a combination of a plurality of terminal devices in this manner, at least one of the plurality of terminal devices is a first terminal device provided with the input unit 162 for the user to input the target travel information including the alighting location. The first terminal device is, for example, an information terminal of a non-wearable type, such as a smartphone, that includes a relatively large touch pad through which the user can input information easily. Then, at least one other terminal device is a second terminal device provided with the output unit 164 constituted by at least one of the display unit and the vibrator. The second terminal device is a wearable information terminal, such as a smartwatch, that includes a relatively small touch pad but that is worn by the user all the times and can continuously provide information to the user in a visual form or in a tactile form.

For example, a smartphone that is in the user's bag and that has received the information providing instruction from the server 200 may transmit a predetermined command to a smartwatch, and the smartwatch may provide a notification to the user in accordance with the command. To be more specific, a first command that the smartphone that has received the information providing instruction from the server 200 transmits to the smartwatch causes the smartwatch to display that the transportation service that the user has boarded does not stop at the alighting location through the indicator light or an icon or the like on the display. In addition, a second command that the smartphone transmits to the smartwatch in a similar manner causes the vibrator provided in the smartwatch to vibrate the main body of smartwatch.

Such a configuration makes it possible to prompt the user to check the detailed information on the smartphone by using the information terminal with which the user is in contact for a longer period of time or that comes into the user's eyesight more frequently, and the information concerning the travel can be provided to the user more reliably and more promptly.

Thus far, the travel information providing method according to the present embodiment and the travel information providing system that implements the travel information providing method have been described. According to the foregoing, upon the user carrying the mobile information terminal having started traveling by public transportation, it is determined promptly whether this actual travel is appropriate with respect to the target travel intended by the user. Thus, in a case in which this travel is not appropriate, the information can be presented to the user promptly. Furthermore, this determination is not made until the user starts traveling by public transportation. Thus, an occurrence of an erroneous notification can be prevented, and the reliability of the information provided with regard to the travel can be ensured more reliably. In addition, the determination as to the appropriateness of the travel can be made even in a situation in which the travel route does not actually deviate from the appropriate travel route by referring to the stopping locations of the transportation service that the user has boarded indicated by the operation information and the information concerning the target travel of the user (target travel information). For example, the detection can be made prior to passing the G station in the second pattern illustrated in FIG. 1B. The detection can be made prior to arriving at the B station in the third pattern illustrated in FIG. 1C.

In this manner, the travel information providing system 10 according to the present embodiment determines whether the user has boarded a vehicle and is traveling by the vehicle on the basis of the calculated traveling speed of the user and determines whether the travel is appropriate if the user is traveling by the vehicle. Thus, an instance of taking a wrong transportation service that could not be detected in an existing technique can be detected, and an instance of taking a wrong transportation service that could be detected with a delay can be detected at an earlier stage. As a result, the separation from the target travel that has been initially planned in order to arrive at a destination can be reduced as compared to that of the existing technique, and the user can arrive at a destination while a waste of time and money can be suppressed as much as possible.

It is to be noted that the foregoing description of the present embodiment is a specific example thereof, and the present embodiment is not limited to this example. Hereinafter, embodiments that provide advantageous effects similar to that of the above or additional advantageous effects will be described as modifications of the present embodiment.

Modification of First Embodiment

1. First Modification

FIG. 6 is a block diagram illustrating a configuration of a travel information providing system 10A according to a modification of the first embodiment. The travel information providing system 10A according to the present modification differs from the travel information providing system 10 in that a mobile information terminal 100A includes a movement detecting unit 170 in addition to the configuration of the mobile information terminal 100.

The movement detecting unit 170 detects the movement of the mobile information terminal 100A and outputs information concerning the detected movement, or specifically, outputs information indicating the movement of the mobile information terminal 100A indicated by one or more of the direction, the distance, the angle, and the speed of the movement of the mobile information terminal 100A (hereinafter, also referred to as movement information). The movement detecting unit 170 is implemented, for example, by a variety of sensors that detect movement, such as an acceleration sensor, a gyro sensor, or a compass sensor, or a combination thereof. The movement information output by the movement detecting unit 170 is passed to the control unit 120 and is used in the processing in the travel information providing system 10A. It is to be noted that the movement detecting unit 170 may also function as the input unit 162. Thus, for example, a specific movement of the mobile information terminal 100A can be received as a predetermined input.

The movement information output by the movement detecting unit 170 is used in the determination in step S202, or in other words, used in the determination as to whether the user has boarded a vehicle of public transportation and started traveling by the vehicle. Similarly to the operation of the travel information providing system 10 according to the first embodiment illustrated in FIG. 4A, the movement information is transmitted to the server 200 from the mobile information terminal 100A prior to step S202.

In the determination in step S202 that uses the movement information, a movement signal indicating an acceleration equal to or greater than a predetermined magnitude, for example, may be used as a material for determining that the user has started traveling by a vehicle of public transportation. In addition, the means by which the user is traveling may be determined on the basis of the movement information that indicates rocking of a specific magnitude, in a specific cycle, or the like or the duration of the rocking. In a case in which the mobile information terminal 100A is a smartwatch, the movement detected by the movement detecting unit 170 can also be the movement of a user's arm. For example, in a case in which the movement information indicates a somewhat periodic swing of an arm, it is determined that the user is traveling on foot or by running.

Then, a combination of a change in the position indicated by a signal output by the positioning unit 150 and the movement indicated by the movement information may be used to determine the means by which the user is traveling. For example, it may be determined that the user has boarded a vehicle in a case in which the traveling speed calculated from the travel distance between the first time and the second time exceeds the first threshold value and the movement of the mobile information terminal 100A between the first time and the second time indicated by the movement information falls below a predetermined threshold value (hereinafter, also referred to as a second threshold value). In other words, the server 200 determines that the user has started traveling by public transportation when, although the position of the user changes at a certain speed or higher, the user does not move his/her body that much. It is to be noted that the predetermined threshold value concerning the traveling speed in this case may differ from the threshold value used in the first embodiment. For example, it may be determined that the user has boarded a vehicle and started traveling by the vehicle in a case in which, although the user is traveling at a speed of no less than 20 km/h and less than 25 km/h, the movement information indicates hardly any movement. Alternatively, a condition concerning the time may further be added in making the determination in step S202. For example, it may be determined that the user has boarded a vehicle and started traveling by the vehicle in a case in which the state in which the user is traveling at a speed of no less than 20 km/h and less than 25 km/h and the movement information indicates hardly any movement continues for a predetermined period of time.

In this manner, the determination as to whether the user has boarded a vehicle of public transportation and started traveling by the vehicle can be made with higher accuracy by additionally using the movement information acquired by the mobile information terminal 100A carried by the user. Thus, an occurrence of an erroneous notification can be prevented, and the reliability of the information provided with regard to the travel can be ensured more reliably.

2. Second Modification

The travel information providing system 10 according to the present embodiment and the travel information providing system 10A according to the modification thereof (hereinafter, also referred to as a travel information providing system 10 without making a distinction therebetween) may determine the pattern for an instance of taking a wrong transportation service and present information including the result of that determination to the user. The user can determine a traveling method for arriving at a destination from the situation in which the user has taken a wrong transportation service on the basis of the stated information. An example of a procedure for determining the pattern for an instance of taking a wrong transportation service will be illustrated, hereinafter.

Figure 7:
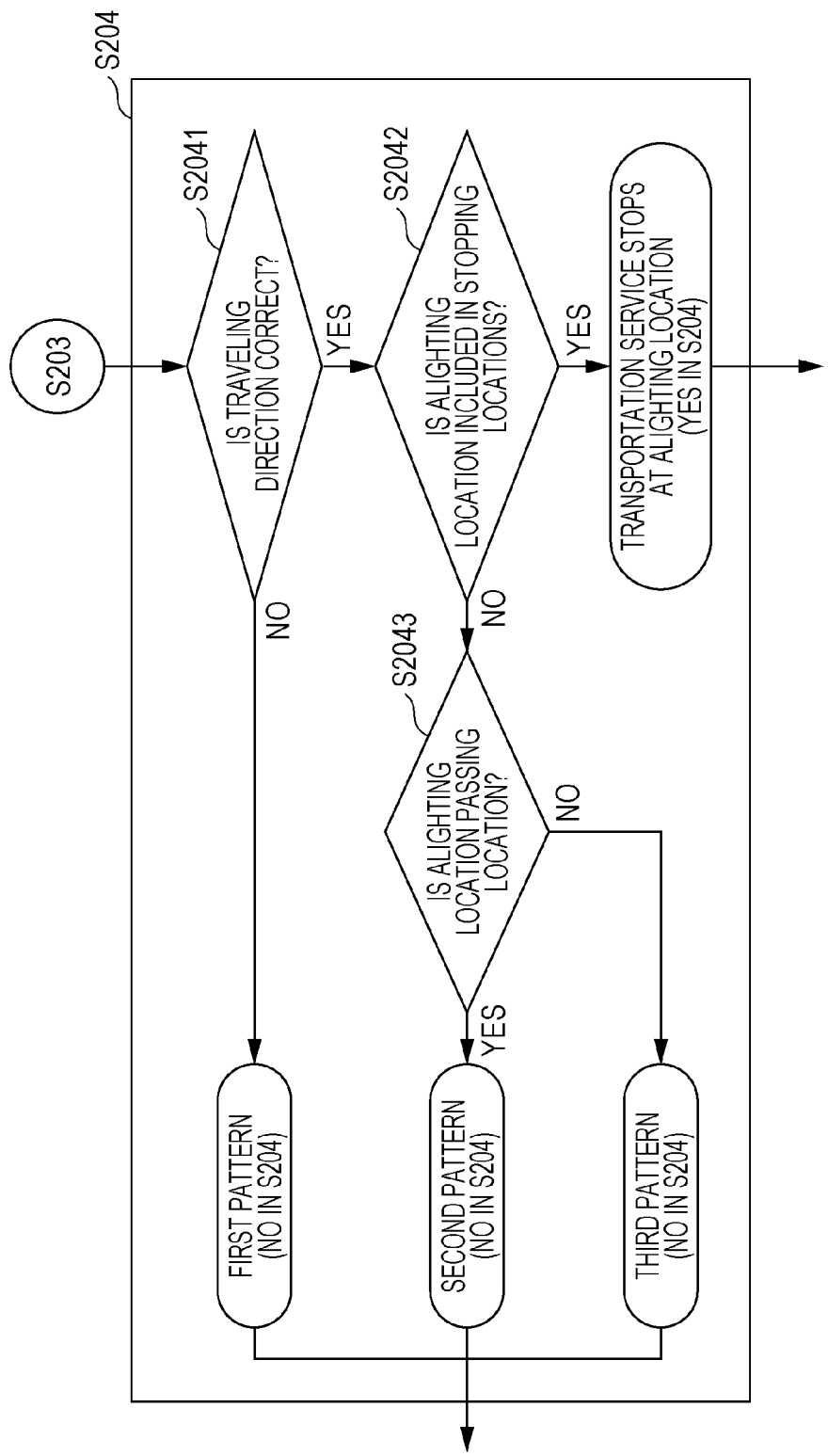
FIG. 7 is a flowchart of a processing procedure for determining the propriety of the travel including a determination on the pattern for an instance of taking a wrong transportation service in a travel information providing method according to a modification of the first embodiment.

FIG. 7 is a flowchart illustrating the processing procedure for determining the propriety of the travel including the determination of the pattern for an instance of taking a wrong transportation service in step S204 illustrated in FIG. 4A. In other words, the processing up to step S203 has already been executed, and the transportation service that the user has boarded has been identified by the agent of the processing, for example, by the server 200.

First, the difference between the target travel direction indicated by the target travel information and the vehicle traveling direction of the transportation service identified in step S203 indicated by the operation information is determined (step S2041). The details of this determination is the same as those described in the first embodiment, and thus description thereof will be omitted here.

If the target travel direction differs from the vehicle traveling direction (NO in step S2041), it is determined that this instance of taking a wrong transportation service is of the first pattern in which the user has boarded a transportation service that is bound for a direction different from the target direction. In this case, for example, information such as the one illustrated in FIG. 8A may be provided to the user via the mobile information terminal 100 (or 100A). The user who has been provided with this information can alight for a transfer and then attentively board another transportation service by finding guidance of transportation services headed for the opposite direction or can check an appropriate destination name, the boarding location, and so on with a staff member of the public transportation.

If the target travel direction is the same as the vehicle traveling direction (YES in step S2041), it is determined whether the alighting location of the user indicated by the target travel information is included in the stopping locations of the transportation service that the user has boarded indicated by the operation information (step S2042). If the alighting location is included in the stopping locations of the transportation service that the user has boarded (YES in step S2042), it is determined that the transportation service that the user has boarded stops at the alighting location (YES in step S204).

If the alighting location is not included in the stopping locations of the transportation service that the user has boarded (NO in step S2042), it is determined whether this alighting location is included in the passing locations of the transportation service that the user has boarded indicated by the operation information (step S2043).

If the alighting location is included in the passing locations of the transportation service that the user has boarded (YES in step S2043), it is determined that this instance of taking a wrong transportation service is of the second pattern in which the type of the transportation service (local, express, etc.) is inappropriate. In this case, for example, information such as the one illustrated in FIG. 8B may be presented to the user via the mobile information terminal 100 (or 100A). The user who has received this information can alight for a transfer and then pay attention to the types of the transportation services displayed on the vehicles or on an information board when boarding the next transportation service or can check a transportation service of an appropriate type with a staff member of the public transportation.

If the alighting location is not included in the passing locations of the transportation service that the user has boarded (NO in step S2043), it is determined that this instance of taking a wrong transportation service can be of the third pattern in which the user has boarded a transportation service that goes into a line that does not include the alighting location past a junction located ahead in the route. In this case, for example, information such as the one illustrated in FIG. 8C may be provided to the user via the mobile information terminal 100 (or 100A). The user who has been provided with this information can alight for a transfer and then pay attention to the destinations (regions) displayed on the vehicles or on an information board when boarding the next transportation service or can check the boarding location and so on for boarding an appropriate transportation service with a staff member of the public transportation.

It is to be noted that the determination of NO is made in step S2043 not only in a case in which the vehicle that the user has boarded goes into a line that does not include the alighting location but also in a case in which the last stop lies prior to the alighting location. In this case, it is possible that the user is aware that the user needs to take a connecting transportation service and is not on a wrong transportation service, but information to the effect illustrated in FIG. 8C may be presented to the user as the information concerning the connection. Alternatively, information distinct from that for the third pattern may be provided to the user by using information including the locations lying ahead of the last stop as the operation information and by determining, after step S2043, whether the alighting location is included in the locations ahead of the last stop.

Figure 8A:
FIG. 8A illustrates an example of a screen that presents, to a user, information concerning one pattern for an instance of taking a wrong transportation service in a travel information providing method according to a modification of the first embodiment.
Figure 8B:
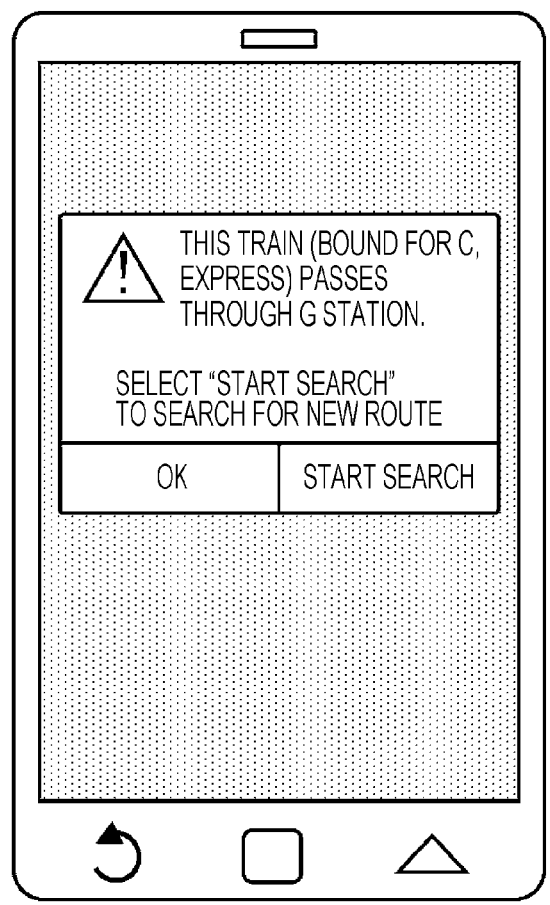
FIG. 8B illustrates an example of a screen that presents, to a user, information concerning another pattern for an instance of taking a wrong transportation service in a travel information providing method according to a modification of the first embodiment.
Figure 8C:
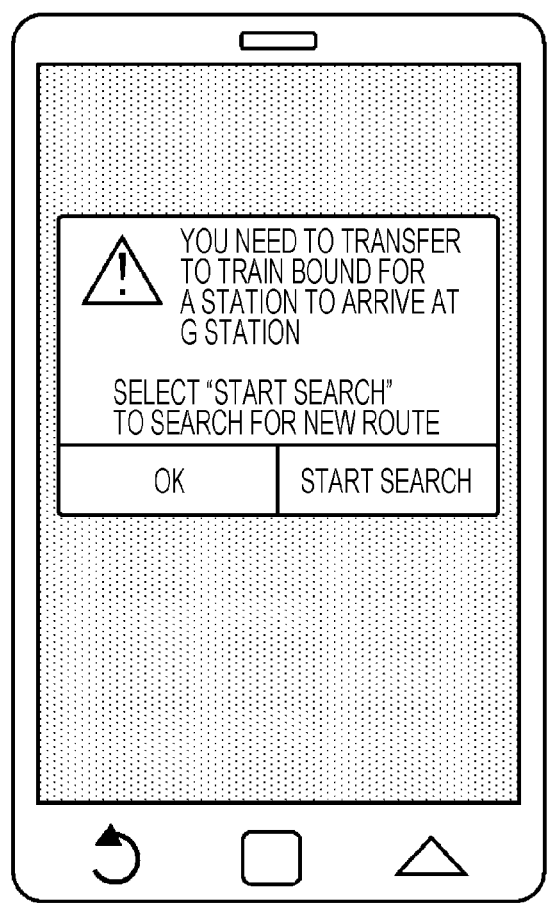
FIG. 8C illustrates an example of a screen that presents, to a user, information concerning yet another pattern for an instance of taking a wrong transportation service in a travel information providing method according to a modification of the first embodiment.

In addition, the information concerning the travel presented to the user as illustrated in FIG. 8A to FIG. 8C is an example, and the wording and the content of the information included in the display and the position, the size, and so on of the display are not limited to this example as long as the display can support the travel of the user thereafter.

In addition, the procedure for determining the pattern for an instance in which the user has taken a wrong transportation service and the information to be provided are not limited to the examples of the procedures described thus far. For example, in a case in which the operation information includes information that indicates the junction locations on the lines, the presence of an occurrence of an instance of taking a wrong transportation service of the third pattern can be determined with reference to the following conditions.

(1) The operation information indicates that the transportation service that the user has boarded stops at a junction location past the boarding location.

(2) The operation information indicates that the transportation service that the user has boarded does not stop at the alighting location past the boarding location (the alighting location is not included in the stopping locations).

(3) The operation information indicates that the junction location is present between the boarding location and the alighting location.

Then, in a case in which these conditions are all satisfied, the user may be provided, via the mobile information terminal 100 or 100A, with information indicating that the user needs to transfer to a transportation service running on a route different from the route of the transportation service that the user has boarded at this junction location, for example, in order to arrive at the alighting location. The user who has been provided with this information can alight at the junction location and transfer to another transportation service by paying attention to the destinations (regions) displayed on the vehicles or on an information board or can check the boarding location and so on for boarding an appropriate transportation service with a staff member of the public transportation.

In this manner, the determination as to the propriety of the travel of the user can be made as well as the pattern for an instance of taking a wrong transportation service by using the target travel information and the operation information. Then, presenting the information corresponding to the pattern to the user enables the user to grasp the information to be checked in order to arrive at the destination. Thus, even in unfamiliar areas or with unfamiliar public transportation, the user can travel appropriately with less anxiety thereafter.

3. Third Modification

The travel information providing system 10 according to the present embodiment and the travel information providing system 10A according to the modifications thereof may further provide the user with information for the user to travel to the alighting location (hereinafter, also referred to as proposed route information) in addition to the information described above in a case in which the travel of the user is not appropriate. This proposed route information indicates, for example, a transfer location, which is the location where the user alights from the vehicle that the user has boarded, and the transportation service that the user is to board at the transfer location.

Figure 9:
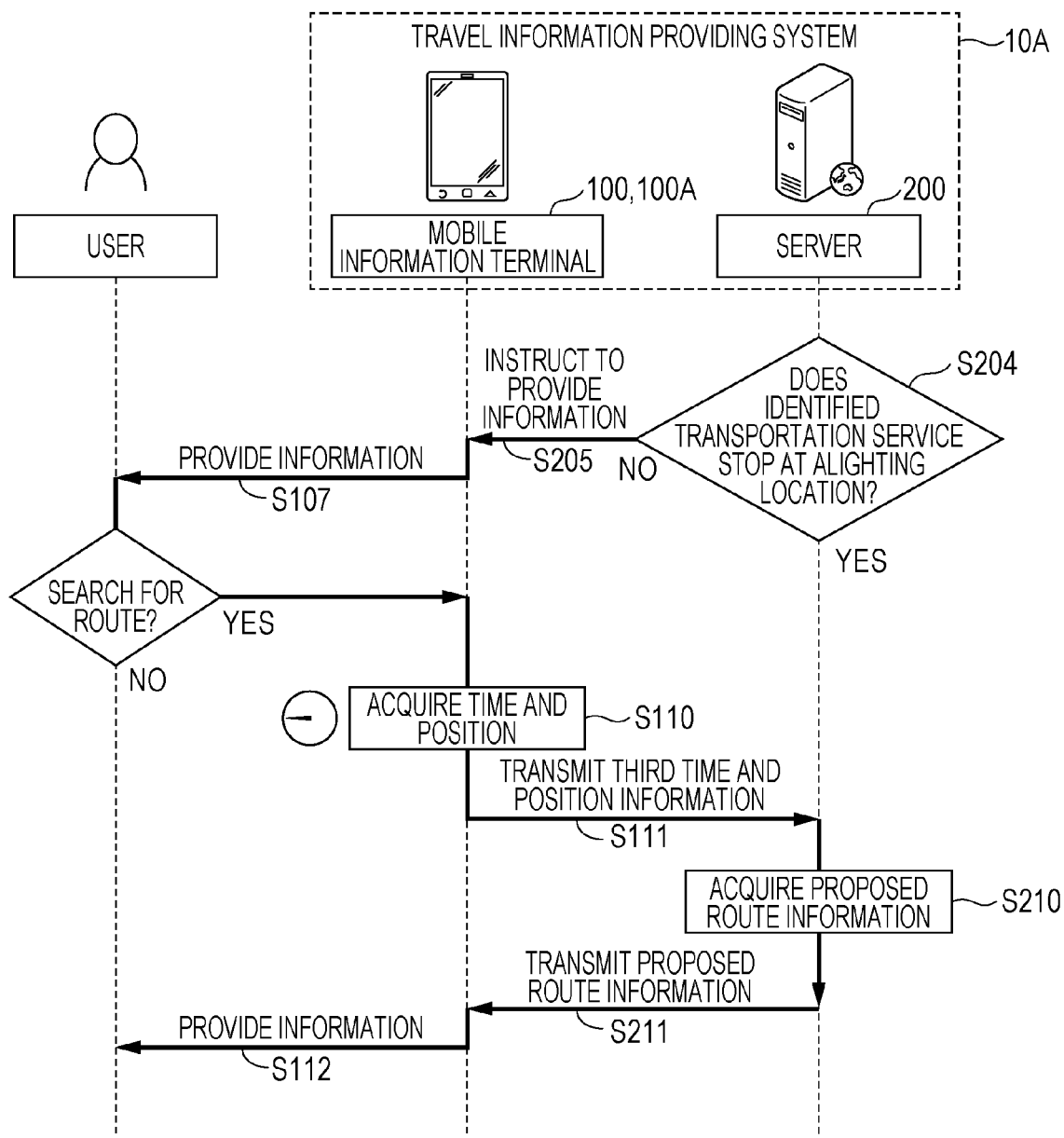
FIG. 9 is a flowchart illustrating a processing procedure for presenting proposed route information in a travel information providing method according to a modification of the first embodiment.

An example of providing this proposed route information and the procedure therefor will be described. FIG. 9 is a flowchart illustrating a processing procedure for providing the proposed route information. In this example, the assumption is that it has determined in step S204 illustrated in FIG. 4A that the transportation service that the user has boarded does not stop at the alighting location of the user indicated by the target travel information and the information such as that illustrated in FIG. 5A or FIG. 8A to FIG. 8C is being provided to the user via the mobile information terminal 100 or 100A (hereinafter, also referred to as a mobile information terminal 100 without making a distinction therebetween).

When the user who has been provided with the information described above via the mobile information terminal 100 selects "start search," the mobile information terminal 100 newly acquires the time and the position (step S110).

Next, the mobile information terminal 100 transmits, to the server 200, third time and position information, which is the information of the newly acquired time and position (step S111). The third time and position information is an example of third information of the present disclosure.

Next, the server 200 identifies the transfer location, which is the location where the user transfers to another transportation service in order to travel to the alighting location, on the basis of the time and the position indicated by the receive third time and position information and the operation information. This transfer location is indicated, in the operation information, as a stopping location where the transportation service that the user has boarded stops past the boarding location. Furthermore, the server 200 identifies a transportation service that stops at the alighting location past the transfer location and that departs from the transfer location at a time later than the time at which the transportation service that the user has boarded arrives at the transfer location on the basis of the third time and position information, the operation information, the transfer location, and the alighting location. Hereinafter, information that indicates this transportation service and the transfer location is referred to as the proposed route information. The server 200 acquires the proposed route information in this manner (step S210).

Then, the server 200 transmits the acquired proposed route information to the mobile information terminal 100 as the information to be provided to the user via the mobile information terminal 100 (step S211). The mobile information terminal 100 that has received this instruction provides this proposed route information to the user via the output unit 164 of the user interface 160 (step S112). The proposed route information may include, aside from the above, information that can be acquired from the operation information, such as the duration between when the user alights at the transfer location and when the user boards the next vehicle and the time at which the user arrives at the alighting location.

Although the user is inquired whether the user hopes for a route search and the proposed route information is provided when the user hopes for the proposed route information in the example described above, the proposed route information or a notification indicating that there is proposed route information may be provided to the user without inquiring the user. In that case, the server 200 transmits, to the mobile information terminal 100, an instruction directing that the third time and position information be transmitted, in place of the information providing instruction, in step S205. After the mobile information terminal 100 receives this instruction, the procedures in step S110 and thereafter are executed.

In this manner, in a case in which it is determined in step S204 that the transportation service that the user has boarded does not stop at the alighting location, the user is provided with, in addition to a notification to that effect or the information indicating the pattern for an instance of taking a wrong transportation service, information concerning the travel in order to arrive at the target alighting location (destination). Thus, in a case in which the user has taken a wrong transportation service, the user can acquire the information for arriving at the destination promptly in a series of processes following the notification regarding the wrong transportation service.

4. Fourth Modification

The travel information providing system 10 according to the present embodiment and the modifications thereof described above provides information concerning the travel in a case in which the transportation service that the user has boarded does not stop at the alighting location. The travel information providing system 10 may provide information concerning the travel even in a case in which the transportation service that the user has boarded stops at the alighting location (YES in step S204 illustrated in FIG. 4A, FIG. 7, and FIG. 9).

As an example of a mode of providing the information in this case, the mobile information terminal 100 may provide a notification to the effect that the transportation service that the user has boarded stops at the alighting location (hereinafter, also referred to as an appropriate travel notification) by operating, for example, the vibrator or the indicator light. This operation may be implemented in a pattern different from that of the operation (vibration or light emission) for notifying that the transportation service that the user has boarded does not stop at the alighting location (hereinafter, also referred to as an inappropriate travel notification). Thus, the user can know the content of the notification on the basis of the difference in the pattern of vibration or light emission.

Therefore, the user who has received an appropriate travel notification or an inappropriate travel notification via a smartwatch, for example, does not need to check any more detailed information by displaying such information on a smartphone. In a case in which the vibration and the light emission are used in combination, the pattern of light emission may differ in an inappropriate travel notification and in an appropriate travel notification while the pattern of vibration is kept constant. For example, the user who has sensed the vibration of the smartwatch can find the propriety of the traveling by looking at the color of the emitted light of the indicator light of the smartwatch. Instead of combining the vibration and the light emission, the vibration and a notification on a display may be combined. In the example of the smartwatch, a simple graphic such as an icon or a letter or a combination thereof indicating that the travel is appropriate may be displayed on the display unit instead of the indicator light. Alternatively, the scheduled arrival time at the alighting location, the number of locations where the transportation service stops prior to arriving at the alighting location, and so on may further be displayed.

Thus, the user who is traveling can find promptly the result as to whether the user has boarded the appropriate transportation service. Once the user finds that the user has boarded the appropriate transportation service, the user can thereafter feel at ease and continue traveling even in an unfamiliar area or with unfamiliar public transportation, for example. In addition, the user can take an action for a subsequent plan, such as communicating with a person whom the user will meet regarding the arrival schedule, for example.

5. Fifth Modification

The travel information providing system 10 according to the present embodiment and the modifications thereof described above acquires, as a part of the vehicle traveling information or the proposed route information, the arrival time at the location where the user alights from the operation information (this location corresponds to the alighting location and the transfer location, herein). The user may be further notified, via the mobile information terminal 100, of the arrival of the vehicle that the user has boarded at the alighting location when or some time before the user arrives at the alighting location on the basis of the arrival time and the time acquired by the mobile information terminal 100 after the user is provided with an inappropriate travel notification or an appropriate travel notification.

This notification is provided, for example, through vibration. In addition, in this vibration, a pattern different from the pattern (the intensity, the rhythm, the duration, or a combination thereof) used in the inappropriate travel notification described above may be used. Thus, the user can find that the user is approaching or has arrived at the alighting location or the transfer location only through the vibration. Alternatively, in addition to the notification through the vibration, the notification may be provided through the display unit as well. Thus, for example, the user who has sensed the vibration can visually check the content of the notification by looking at the display unit.

In addition, the expression "when the user has arrived at the alighting location" above is not limited to a case in which it is determined that the time acquired by the travel information providing system 10 coincides with the arrival time at the alighting location or the transfer location. It may be determined that the user has arrived at the alighting location prior to the arrival, for example, at a predetermined time preceding the arrival time, and the user may be provided with a notification for the timing of alighting described above. This predetermined time may be set in units of seconds or minutes. Alternatively, the predetermined time may be set with the use of geographical information, such as the stopping location. For example, the time at which the transportation service that the user has boarded departs from or passes the stopping location preceding the alighting location of the user by one may be regarded as the time at which the user has arrived at the alighting location, and the user may be notified accordingly. In this case, for example, the departure time or the passing time at the stopping location preceding the alighting location is acquired from the operation information immediately after it is determined in step S204 that the transportation service that the user has boarded stops at the alighting location or when the proposed route information is acquired in step S210, and the user is notified of the alighting timing when the acquired time coincides with the departure time or the passing time.

In this manner, the user is notified of the alighting timing when it is determined that the user has arrived at the alighting location on the basis of the time and the operation information acquired by the mobile information terminal 100. The technique for determining whether the user has arrived at the alighting location is not limited to the above. In a case in which it is possible to access the map data, the determination as to whether the user has arrived at the alighting location may be made on the basis of the position and the map data acquired by the mobile information terminal 100. For example, upon determining that the transportation service that the user has boarded stops at the alighting location in step S204, the server 200 successively acquires information indicating the position of the transportation service that the user has boarded from the mobile information terminal 100. The information that the server 200 acquires from the mobile information terminal 100 at this point is, for example, the third time and position information described above. Then, the server 200 compares the position of the transportation service that the user has boarded with the position of the alighting location, and if the distance therebetween is within a predetermined distance, the server 200 may notify the user, via the mobile information terminal 100, that the transportation service that the user has boarded is about to arrive at the alighting location.

In addition, the determination may be made by using both the temporal information and the geographical information as described above. For example, the configuration may be such that the user is notified of the alighting timing described above when one or both of the following two conditions hold true: three minutes is left until the arrival time at the alighting location, and the transportation service that the user has boarded has departed from the station preceding the alighting location by one. In addition, this determination may be made in either of the mobile information terminal 100 and the server 200 in the travel information providing system 10. However, in consideration of the causes that vary the communication speed between the two, such as the circuit congestion and a variation in the radio wave condition during travel, the notification is more likely to be provided timely and reliably when the determination is made in the mobile information terminal 100 that acquires the position and the time, which are the pieces of information used for making the determination, that change by the minute.

Second Embodiment

The travel information providing system 10 according to the first embodiment and the modifications thereof determines whether the user has actually boarded a vehicle and is traveling by the vehicle on the basis of the calculated traveling speed of the user and determines the propriety of the travel in a case in which the user is traveling by the vehicle. Thus, an instance of taking a wrong transportation service that could not be detected in an existing technique can be detected, and an instance of taking a wrong transportation service that could be detected with a delay can be detected at an earlier stage. As a result, the separation from the target travel initially intended by the user in order to arrive at the destination can be reduced, and an influence on the travel schedule can be kept small.

However, the travel information providing system 10 according to the first embodiment and the modifications thereof described above determines the propriety of the travel after the travel has started, and thus an instance of taking a wrong transportation service cannot be prevented. Hereinafter, a travel information providing system that provides a notification by determining the propriety of the user's travel by a vehicle at an even earlier stage, or in other words, before the user boards the vehicle or before the vehicle that the user has boarded departs and a travel information providing method that is implemented by the stated travel information providing system will be described as a second embodiment. It is to be noted that the constituent elements of the present embodiment that are common to those of the first embodiment are given identical reference characters, and detailed description thereof will be omitted.

1. Configuration

Figure 10:
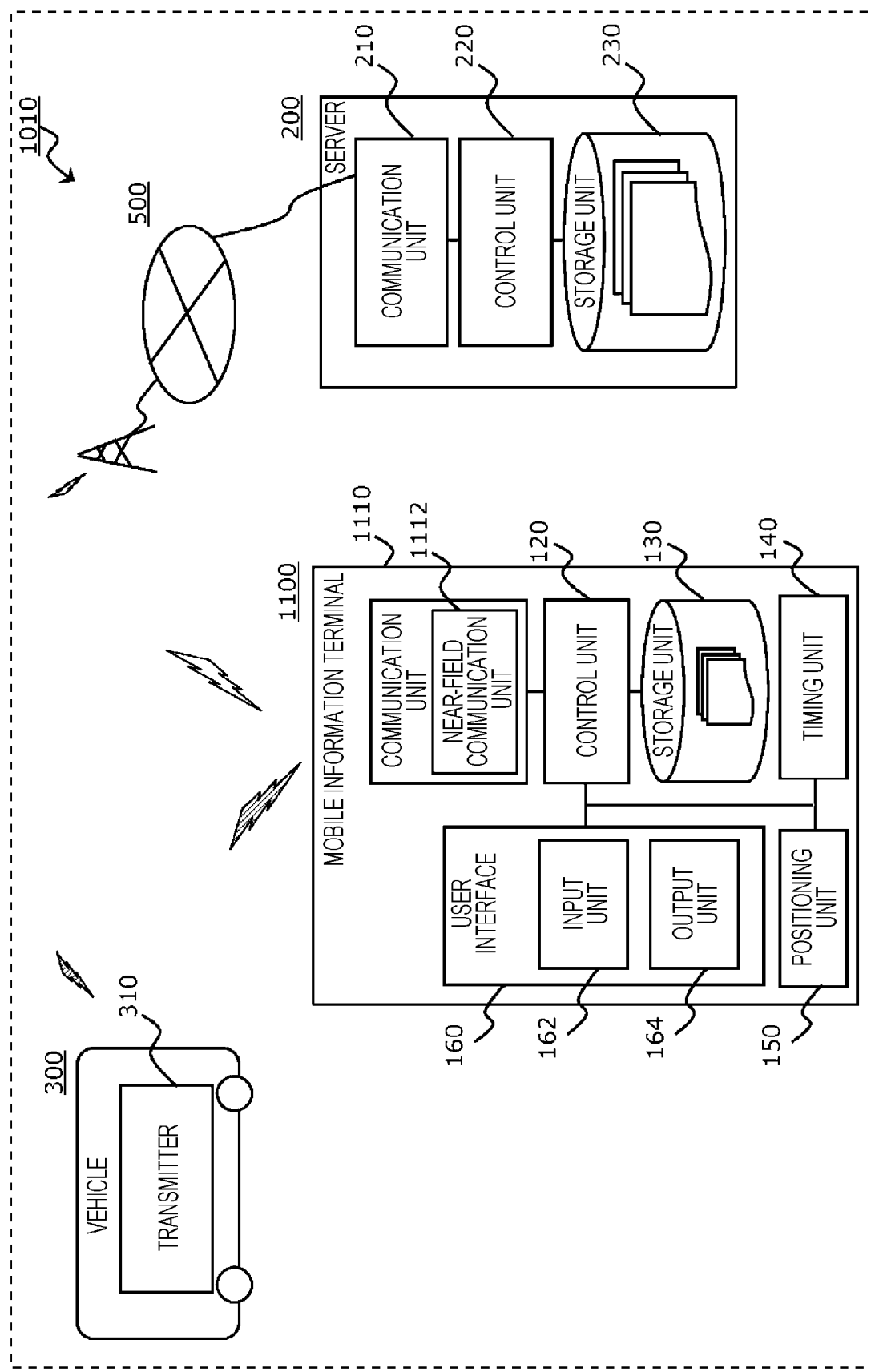
FIG. 10 is a block diagram illustrating a configuration of a travel information providing system according to a second embodiment.

FIG. 10 is a block diagram illustrating a configuration of a travel information providing system 1010 for executing the travel information providing method according to the present embodiment.

In the travel information providing system 1010, a server 200 may be basically identical to that of the first embodiment and is connected to a mobile information terminal according to the present embodiment so as to be capable of communicating with each other via a communication circuit 500, such as the internet.

In addition, the travel information providing system 1010 includes, in addition to the mobile information terminal and the server according to the first embodiment, a transmitter 310 provided in a vehicle 300 illustrated in FIG. 10. This vehicle 300 is a vehicle that the user carrying the mobile information terminal is about to board or a vehicle that the user has boarded and is waiting for the departure at a location for boarding and alighting from vehicles of public transportation, such as a train station or a bus stop. The transmitter 310 is a wireless signal transmitter that emits a signal indicating transportation service identification information, which is the information for identifying the transportation service of the vehicle 300, and is a beacon capable of transmitting a signal compliant with the near-field communication standards of Bluetooth (registered trademark) or the like, for example. The communication system used by the transmitter 310 is not limited to Bluetooth (registered trademark) and may be other standards, such as ZigBee (registered trademark).

In addition, a mobile information terminal 1100, which is the mobile information terminal according to the present embodiment, differs from the mobile information terminal 100 according to the first embodiment in that a communication unit 1110 includes a near-field communication unit 1112. The mobile information terminal 1100 acquires the transportation service identification information transmitted from the transmitter 310 described above via the near-field communication unit 1112. The near-field communication unit 1112 is implemented by a communication module that supports the communication system of the transmitter 310.

It is to be noted that the operation information stored in the storage unit 130 of the mobile information terminal 1100 or in the storage unit 230 of the server 200 may be basically identical to the operation information according to the first embodiment illustrated in FIG. 3 and includes at least the names (AZ001, ZA002, etc. in FIG. 3) for identifying each transportation service and the stopping locations of each transportation service.

In addition, the locations of the operation information and other pieces of information stored in the storage unit 130 or the storage unit 230 and the functional modules of each application are similar to those of the first embodiment and do not need to be stored in both the storage unit 130 and the storage unit 230. It suffices that these pieces of data be accessible in the travel information providing system 1010 as a whole and the locations of these pieces of data are not limited.

2. Travel Information Providing Method

Next, the travel information providing method according to the present embodiment will be described along with an example of the operation of the above-described travel information providing system 1010 that implements the travel information providing method.

Figure 11:
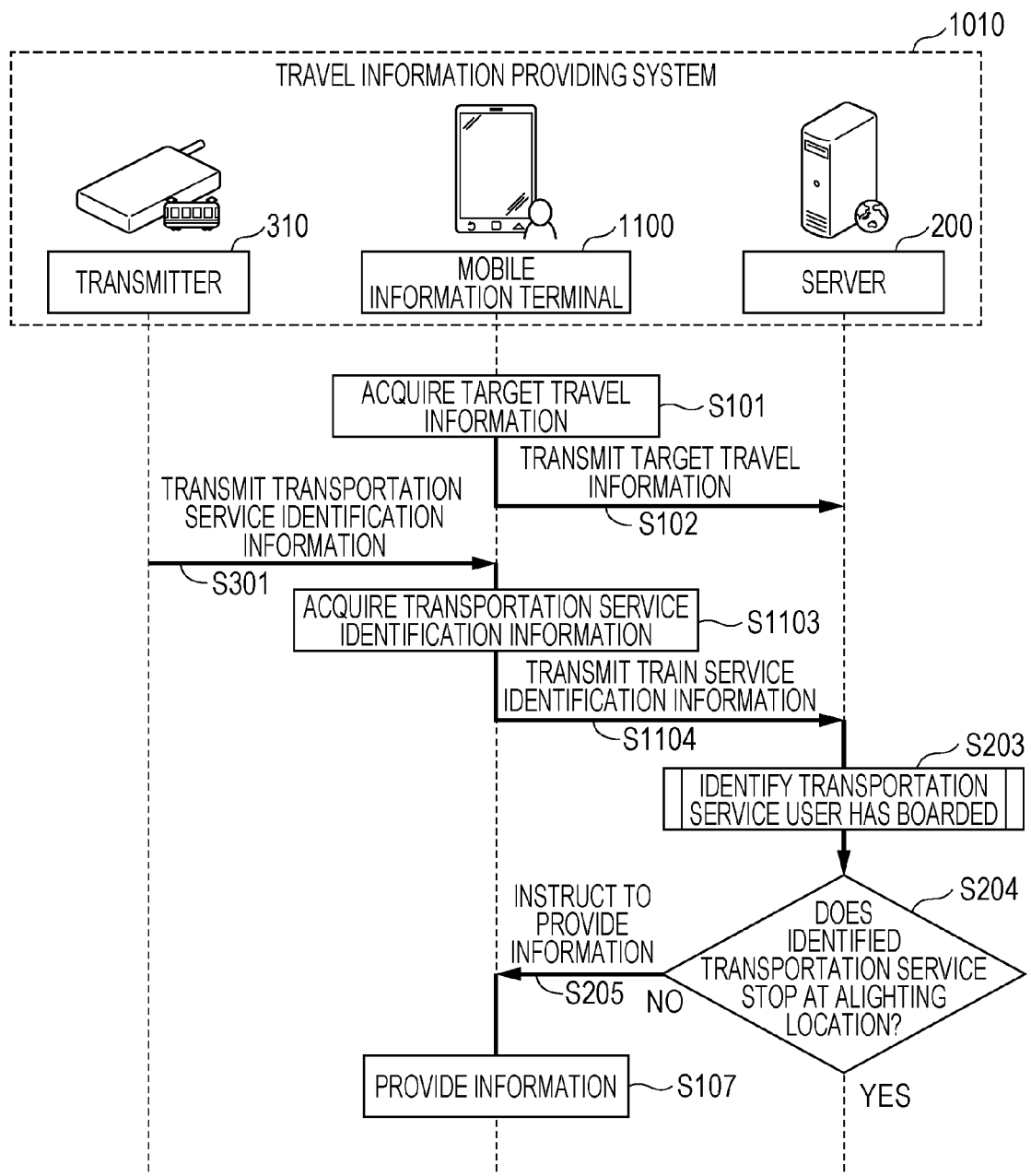
FIG. 11 illustrates a flow of a travel information providing method according to the second embodiment along with data used in an operation of a travel information providing system and the movement of the data.

FIG. 11 illustrates the flow of the travel information providing method according to the present embodiment along with the data used in the operation of the travel information providing system 1010 that implements the stated method and the movement of the data. It is to be noted that the steps of the present embodiment that are common to those of the first embodiment are given identical reference characters, and detailed description thereof will be omitted or simplified. The present embodiment differs from the first embodiment in that the user carrying the mobile information terminal 1100 does not need to start traveling by a vehicle of public transportation, and thus the position or the status of the user in each step will be additionally described as appropriate in the following description.

First, the mobile information terminal 1100 acquires the target travel information, which is the information concerning the travel intended by the user who travels by boarding a vehicle of public transportation (step S101). The way how this target travel information is acquired is the same as that of the first embodiment.

Next, the mobile information terminal 1100, while being carried by the user, acquires the transportation service identification information from the transmitter 310 within a range in which the mobile information terminal 1100 can communicate (step S301, step S1103). At this point, the user, for example, has boarded the vehicle and is waiting for the departure. At this point, the mobile information terminal 1100 and the transmitter 310 provided in the vehicle of this transportation service are close enough to communicate with each other. Meanwhile, there is a constraint on this communicable distance, and thus the mobile information terminal 1100 does not receive transportation service identification information from a transmitter 310 provided in a vehicle of another transportation service. Furthermore, the information for identifying the transportation service acquired in this manner has no possibility of an error arising from a false recognition or an operational error of the user, unlike the information input by the user, for example. In addition, with the method of identifying the transportation service by using the position and the time as in the first embodiment, the accuracy in identifying the transportation service may decrease or it may become impossible to identify the transportation service due to the disruption in the operation schedule. In addition, the accuracy in identifying the transportation service is likely to decrease also in a situation in which a plurality of transportation services travel in the same direction within the same section, as in urban areas or around terminals. Therefore, with the method according to the present embodiment, the accuracy in identifying the transportation service is higher than that of the above-described methods. A specific example of the transportation service identification information is information that can be used to search for the information for identifying a specific transportation service in the operation information, such as AZ001 in the example described above, for example.

Next, the mobile information terminal 1100 transmits the received transportation service identification information to the server 200 (step S1104).

Next, the server 200 identifies the transportation service of the public transportation that the user has boarded (step S203). This vehicle traveling information is the same as that acquired in the first embodiment.

The procedures thereafter are basically the same as the procedures in step S204 and thereafter according to the first embodiment illustrated in FIG. 4A. It is determined whether the transportation service indicated by the transportation service identification information stops at the alighting location indicated by the target travel information on the basis of the transportation service identified in step S203, the target travel information acquired in step S102, and the operation information (step S204). If the transportation service that the user has boarded does not stop at the alighting location of the user, the information providing instruction is transmitted to the mobile information terminal 1100 (step S205). The user who has checked the information provided in step S107 in a later stage can avoid taking a wrong transportation service by immediately alighting from the vehicle that the user has boarded if the vehicle has not departed yet.

In this manner, with the travel information providing method according to the present embodiment, it is determined whether the transportation service stops at the alighting location of the user on the basis of the information for reliably identifying the transportation service that the user is to use (transportation service identification information). Therefore, the accuracy of the determination is high. In addition, this transportation service identification information can be acquired before the user actually starts traveling by a vehicle. Therefore, the determination as to whether the travel by this transportation service is appropriate can be made promptly.

Modification of Second Embodiment

It suffices that the communication system of the transmitter 310 described above be one that limits the region in which the mobile information terminal 1100 of the user can acquire the transportation service identification information. Therefore, aside from the specific standard as described above, visible light communication with a relatively short communication distance may be used, for example. In other words, the transportation service identification information described above is represented by a visible light communication signal. The near-field communication unit 1112 in this case is implemented, for example, by a photodiode or an image sensor and is an example of a receiver for visible light communication of the present disclosure. This image sensor may be an image sensor that constitutes a digital camera provided in the mobile information terminal 1100, for example.

In a case in which visible light communication is used, the user needs to take an intentional action for receiving light emitted by the transmitter 310, such as directing the image sensor of the mobile information terminal 1100 toward the transmitter 310. Meanwhile, since such an action is necessary, the situation in which the transmitter 310 and the mobile information terminal 1100 communicate with each other is further limited than in the case of wireless communication of Bluetooth (registered trademark) or the like. Therefore, even when the transmitter 310 is mounted, for example, on the outer surface of the vehicle and the transportation service identification information is transmitted therefrom, crossing between lines on opposite sides of a platform in a station is less likely to occur, for example. For example, the user can acquire the transportation service identification information before boarding a vehicle by directing the mobile information terminal 1100 toward the service in front of the user and can check whether the user may board this transportation service.

In another example of mounting the transmitter 310, the transmitter 310 may be provided in equipment or facilities of public transportation other than the vehicles. For example, lighting apparatuses in the vicinity of the boarding positions in each track on the platform in the station may be used. For example, the user in a line for boarding can receive the light from this lighting apparatus with the mobile information terminal 1100 and acquire the identification information of the next transportation service that is coming into this track. In addition, such a transmitter may be provided at each bus stop in the case of buses or in front of a ticket gate in a case in which the ticket gate differs for different destinations in the case of trains.

This makes it possible for the user to acquire the transportation service identification information with the mobile information terminal 1100 prior to boarding and to check whether the user may board the transportation service that is in front of the user or the next transportation service to arrive.

Other Embodiments

In the embodiments and the modifications thereof described above, the vehicle traveling information, which is the information concerning the travel by a vehicle that the user has boarded, is acquired by referring to the operation information. Although the description indicates that this operation information is information indicating the entirety or a part of the operation schedule defined by the public transportation, such as the stopping locations of each transportation service of the public transportation and the departure and arrival times at each stopping location, the information indicated by the operation information is not limited thereto. For example, if there is information that indicates the actual operation status transmitted by the public transportation or the like, the travel information providing systems described above may access this information to use this information as the operation information.

This information indicating the operation status indicates, for example, delays that are currently being experienced, extra services that are running, reduced services, and so on. By using such information as the operation information in the embodiments and the modifications thereof described above, the travel information providing systems described above can identify the vehicle that the user has boarded or the vehicle that the user is about to board with high accuracy and acquire accurate vehicle traveling information. As a result, the determination as to the propriety of the user's travel can be made with higher accuracy. In addition, proposed transfer information is acquired and provided on the basis of information that conforms to more realistic operation status. The notification of the alighting timing is provided at a timing with less deviation from the timing (setting) intended by the user. Thus, the reliability of the information concerning the travel can be ensured more reliably.

It is to be noted that the information indicating the operation status may be acquired as the mobile information terminal or the server according to the embodiments and the modifications thereof described above directly accesses the server of the public transportation or the like, or the mobile information terminal may acquire information distributed through an information board or the like at each stopping location. The information distributed at each stopping location may include information that indicates the approaching transportation service and the current location thereof, for example.

In addition, if information indicating the operation status is transmitted from a vehicle that the user has boarded and can be used, the travel information providing systems described above may access this information and use this information as the operation information. For example, inside an actual vehicle of public transportation (trains, buses, etc.), the next stopping location is displayed on a screen or announced vocally, or the current location is displayed on a screen. Such information may be used in each determination described above in the travel information providing systems described above. Thus, an advantageous effect similar to that obtained from the information indicting the actual operation status transmitted from the public transportation can be obtained.

In addition, such operation information acquired from a vehicle that the user has boarded may also be presented to the user as information concerning the travel by the public transportation via the mobile information terminal carried by the user.

For example, the mobile information terminal that the user is using in a running vehicle may receive the current position from the transmitter 310, and this information of the position may be displayed in accordance with the user's current usage situation.

Figure 12A:
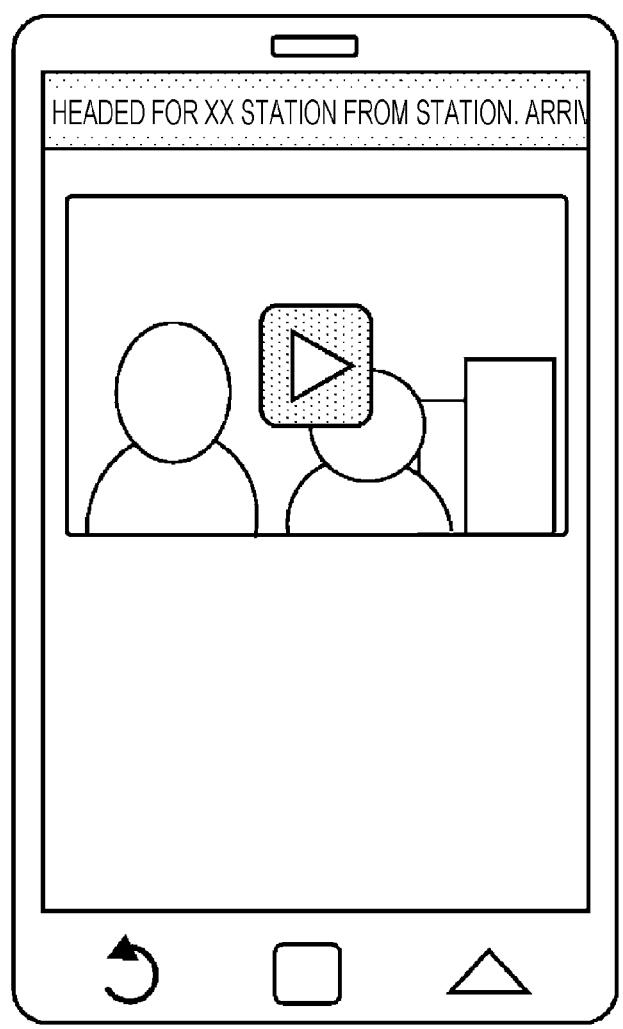
FIG. 12A illustrates an example of a screen that displays operation information acquired by a mobile information terminal being used by a user on a running vehicle according to each of the embodiments and modifications thereof.
Figure 12B:
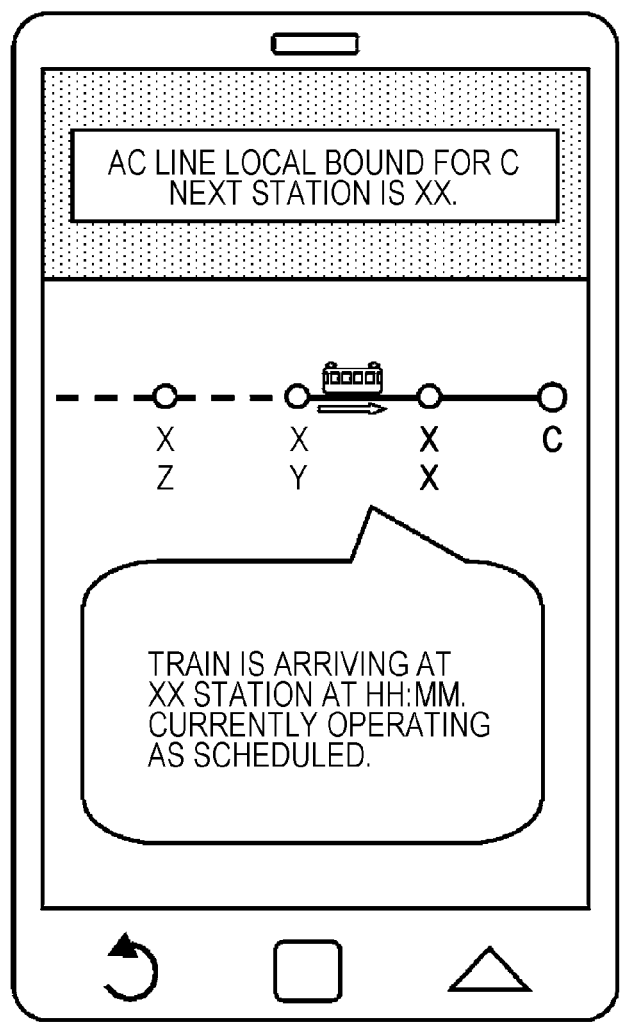
FIG. 12B illustrates another example of a screen that displays operation information acquired by a mobile information terminal being used by a user on a running vehicle according to each of the embodiments and modifications thereof.
Figure 12C:
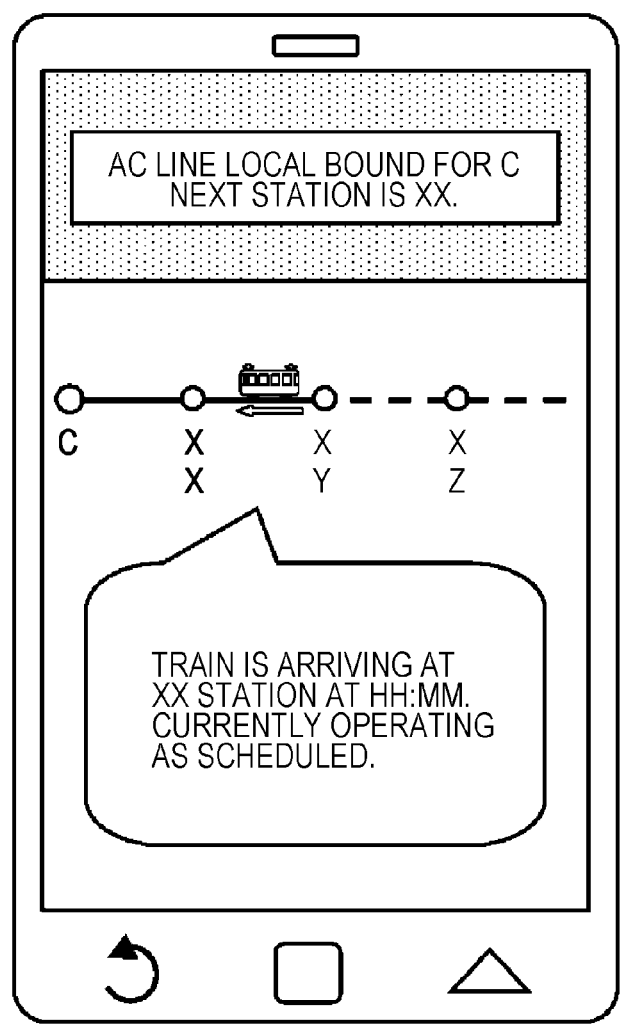
FIG. 12C illustrates yet another example of a screen that displays operation information acquired by a mobile information terminal being used by a user on a running vehicle according to each of the embodiments and modifications thereof.

FIG. 12A to FIG. 12C each illustrate an example of the screen that displays the operation information received by the mobile information terminal that the user is using in a running vehicle.

FIG. 12A illustrates an example of the screen that displays the operation information presented when the user is using an application for playing a moving image. In this example, the information indicating the position of the vehicle is displayed by scrolling the character string in a notification region corresponding to a single line on the upper end portion of the display.

FIG. 12B illustrates an example of the screen that displays the operation information presented with the use of letters, graphics, and symbols. This screen is displayed in a case in which a route guidance application is run, for example. Alternatively, this screen may be displayed in an application for introducing local information or an application dedicated for displaying the operation information. The type of the transportation service that the user is currently on, the destination thereof, the current position on the operation route, the next stopping location are displayed so as to be viewed at once. FIG. 12C is a screen in which the graphics illustrated in FIG. 12B are horizontally reversed. This is an example of the screen displayed on the mobile information terminal of the user who is on the same train as the user for whom the screen illustrated in FIG. 12B is displayed on the mobile information terminal and who is facing a side opposite to the side that the user for the screen in FIG. 12B is facing. In other words, the screen is displayed so that the traveling direction of the vehicle on the screen matches the actual traveling direction of the vehicle on the basis of the information (the direction of the movement) detected by the movement detecting unit of the mobile information terminal. It is to be noted that the screens on which the traveling direction matches the horizontal direction of the display as illustrated in FIG. 12B and FIG. 12C are examples, and the traveling direction may be made to match the vertical direction of the display.

In this manner, the user may be able to be presented continuously with the transportation service that the user has boarded and the operation information of that transportation service including the operation status. Thus, the user can acquire the operation status regardless of the location within the vehicle, the congestion state, and so on. In addition, reliable travel with less anxiety of the user who travels in an unfamiliar area or with unfamiliar public transportation can be supported, for example.

Although an example in which the information is presented to the user by using sounds is not described in the embodiments and the modifications thereof, the information may be presented by using sounds. Although a consideration needs to be given to outputting sounds in a vehicle of public transportation, in a case in which an earphone is connected to the mobile information terminal carried by the user, the information may be presented to the user with sounds via the earphone. Alternatively, in a case in which a body wearable type mobile information terminal supports an output of sounds through bone conduction, the information may be presented through sounds.

In the embodiments and the modifications thereof described above, each of the constituent elements may be constituted by dedicated hardware or may be implemented by executing a software program suitable for each of the constituent elements. Each of the constituent elements may be implemented as a program executing unit, such as a CPU or a processor, reads out a software program recorded on a recording medium, such as a hard disk or a semiconductor memory, and executes the software program. Herein, software that implements the travel information providing system and so on according to the embodiments described above is a program such as those described below, for example.

Specifically, this program is a travel information providing program that causes a computer to execute a method of providing a user with information concerning travel of the user by public transportation via a terminal device, and the terminal device is capable of acquiring a time and a position. The travel information providing program causes the computer to acquire, from the terminal device, destination information indicating an alighting location of the user on the public transportation; to acquire first information and second information from the terminal device, the first information indicating a first time and a position of the terminal device at the first time, the second information indicating a second time and a position of the terminal device at the second time, the second time being later than the first time; to acquire, as a departure time of a transportation service of the public transportation that the user has boarded, a time at which a traveling speed of the terminal device has exceeded a first threshold value on the basis of the first information and the second information; to acquire, as a boarding location where the user has boarded the transportation service of the public transportation, a location where the traveling speed of the terminal device has exceeded the first threshold value on the basis of the first information and the second information; to acquire operation information indicating an operation schedule of the public transportation that runs in an operation route including the alighting location and the boarding location; to identify the transportation service that the user has boarded on the basis of the departure time, the boarding location, and the operation information; to determine whether the transportation service that the user has boarded stops at the alighting location on the basis of the transportation service that the user has boarded, the alighting location, and the operation information; and to provide the user with information indicating that the transportation service that the user has boarded does not stop at the alighting location via the terminal device in a case in which it is determined that the transportation service that the user has boarded does not stop at the alighting location. Alternatively, this program is a travel information providing program that causes a computer to execute a method of providing a user traveling by public transportation with information concerning the travel via a terminal device, and the terminal device is capable of acquiring a time and a position. The travel information providing program causes the computer to acquire, from the terminal device, destination information indicating an alighting location of the user on public transportation; to acquire current information from the terminal device, the current information indicating a current time and a position of the terminal device at the current time; to acquire identification information for identifying a transportation service of the public transportation that the user boards from a transmitter of the public transportation that the user boards; to acquire operation information indicating an operation schedule of the public transportation; to determine whether the transportation service that the user boards stops at the alighting location after the current time on the basis of the destination information, the current information, the identification information, and the operation information; and to provide the user, via the terminal device, information indicating that the transportation service that the user boards does not stop at the alighting location in a case in which it is determined that the transportation service that the user boards does not stop at the alighting location after the current time.

Although the travel information providing methods and so on according to one or a plurality of aspects have been described on the basis of embodiments and modifications thereof, the present disclosure is not limited to these embodiments and the modifications thereof. Unless departing from the spirit of the present disclosure, various modifications of the embodiments, aside from the foregoing, that are conceivable by a person skilled in the art or an embodiment obtained by combining the constituent elements in different embodiments may also be included within the scope of one or a plurality of aspects.

The present disclosure can be used in a mobile information terminal and in a program (application) that provides a service used via the mobile information terminal. Specific examples of the mobile information terminal include a non-wearable type mobile information terminal, such as a mobile phone including a smartphone, a body wearable type mobile information terminal, such as a smartwatch or a smart ring, and a combination thereof.

What is claimed is:

1. A travel information providing method for providing a user with information concerning travel of the user by public transportation via a terminal device, the terminal device being capable of acquiring a time and a position, the travel information providing method comprising:

acquiring, from the terminal device, destination information indicating an alighting location of the user on the public transportation;

acquiring first information and second information from the terminal device, the first information indicating a first time and a position of the terminal device at the first time, the second information indicating a second time and a position of the terminal device at the second time, the second time being later than the first time;

acquiring, as a departure time of a transportation service of the public transportation that the user has boarded, a time at which a traveling speed of the terminal device has exceeded a first threshold value on the basis of the first information and the second information;

acquiring, as a boarding location where the user has boarded the transportation service of the public transportation, a location where the traveling speed of the terminal device has exceeded the first threshold value on the basis of the first information and the second information;

acquiring operation information indicating an operation schedule of the public transportation that runs in an operation route including the boarding location;

identifying the transportation service that the user has boarded on the basis of the departure time, the boarding location, and the operation information;

determining whether the transportation service that the user has boarded stops at the alighting location on the basis of the transportation service that the user has boarded, the alighting location, and the operation information; and providing the user with information indicating that the transportation service that the user has boarded does not stop at the alighting location via the terminal device in a case in which it is determined that the transportation service that the user has boarded does not stop at the alighting location, wherein it is determined that the transportation service that the user has boarded stops at the alighting location in a case in which the operation information indicates that the transportation service that the user has boarded stops at the alighting location past the boarding location.

2. The travel information providing method according to claim 1, wherein the terminal device includes a sensor that detects a movement of the terminal device and outputs information indicating the detected movement, and wherein it is determined that the user has boarded the transportation service of the public transportation in a case in which the movement of the terminal device detected between the first time and the second time as indicated by the output information falls below a second threshold value.

3. The travel information providing method according to claim 2, wherein the information indicating the movement of the terminal device includes one or more of a traveling direction, a traveling distance, a traveling angle, and a traveling speed of the terminal device.

4. The travel information providing method according to claim 1, wherein information indicating that the user needs to board a transportation service that runs on a route different from a route of the transportation service that the user has boarded is provided to the user via the terminal device in a case in which the operation information indicates that the transportation service that the user has boarded stops at a junction location past the boarding location, the operation information indicates that the transportation service that the user has boarded does not stop at the alighting location past the boarding location, and the operation information indicates that the junction location is present between the boarding location and the alighting location.

5. The travel information providing method according to claim 1, further comprising:
in a case in which it is determined that the transportation service that the user has boarded does not stop at the alighting location,
acquiring third information from the terminal device, the third information indicating a third time and a position of the terminal device at the third time;
identifying a transfer location for the user to transfer from the transportation service that the user has boarded on the basis of the third information and the operation information, the transportation service that the user has boarded stopping at the transfer location past the boarding location;
identifying a transportation service that stops at the alighting location past the transfer location and that departs from the transfer location at a time later than a time at which the transportation service that the user has boarded arrives at the transfer location on the basis of the third information, the operation information, the transfer location, and the alighting location; and
providing the user, via the terminal device, with further information indicating the transfer location and the identified transportation service of the public transportation.

6. The travel information providing method according to claim 1,
wherein the terminal device includes a display that emits light or displays a letter or a graphic, and
wherein that the transportation service that the user has boarded does not stop at the alighting location is displayed on the display.

7. The travel information providing method according to claim 1,
wherein the terminal device includes a vibrator that vibrates the terminal device, and
wherein the terminal device is vibrated in a first pattern by the vibrator in a case in which it is determined that the transportation service that the user has boarded does not stop at the alighting location.

8. The travel information providing method according to claim 7,
wherein the terminal device is vibrated in a second pattern by the vibrator in a case in which it is determined that the transportation service that the user has boarded stops at the alighting location, the second pattern being different from the first pattern.

9. The travel information providing method according to claim 1, further comprising:
in a case in which it is determined that the transportation service that the user has boarded stops at the alighting location,
acquiring third information from the terminal device, the third information indicating a third time and a position of the terminal device at the third time, the third time being later than the second time;
comparing the position of the terminal device indicated by the third information with a position of the alighting location; and
notifying the user, via the terminal device, that the transportation service that the user has boarded is about to arrive at the alighting location in a case in which the position of the terminal device indicated by the third information is within a predetermined distance from the alighting location.

10. The travel information providing method according to claim 9,
wherein the second terminal device is a wearable terminal.

11. The travel information providing method according to claim 9,
wherein the first terminal device receives fourth information indicating that the transportation service that the user has boarded does not stop at the alighting location in a case in which it is determined that the transportation service that the user has boarded does not stop at the alighting location, and
wherein the first terminal device transmits at least one of a first command and a second command to the second terminal device, the first command causing the display to display that the transportation service that the user has boarded does not stop at the alighting location, the second command causing the vibrator to vibrate the second terminal device.

12. The travel information providing method according to claim 1,
wherein the terminal device includes a first terminal device and a second terminal device,
wherein the first terminal device includes an input for the user to input the alighting location,
wherein the second terminal device includes at least one of a display that emits light or displays a letter or a graphic and a vibrator that vibrates the second terminal device, and
wherein, in a case in which it is determined that the transportation service that the user has boarded does not stop at the alighting location,
the transportation service that the user has boarded does not stop at the alighting location is displayed on the display, and
the second terminal device is vibrated by the vibrator.

13. A travel information providing method for providing a user traveling by public transportation with information concerning the travel via a terminal device, the terminal device being capable of acquiring a time and a position, the travel information providing method comprising:
acquiring, from the terminal device, destination information indicating an alighting location of the user on the public transportation;
acquiring current information from the terminal device, the current information indicating a current time and a position of the terminal device at the current time;
acquiring identification information for identifying a transportation service of the public transportation that the user boards from a transmitter of the public transportation that the user boards;
acquiring operation information indicating an operation schedule of the public transportation;
determining whether the transportation service that the user boards stops at the alighting location after the current time on the basis of the destination information, the current information, the identification information, and the operation information; and notifying the user, via the terminal device, that the transportation service that the user boards does not stop at the alighting location in a case in which it is determined that the transportation service that the user boards does not stop at the alighting location after the current time, wherein it is determined that the transportation service that the user boards stops at the alighting location in a case in which the operation information indicates that the transportation service that the user boards stops at the alighting location past the current position.

14. The travel information providing method according to claim 13,
- wherein the terminal device includes a receiver for visible light communication,
- wherein the identification information is represented by a visible light communication signal, and
- wherein the identification information is acquired via the receiver.

15. A travel information providing apparatus that provides a user with information concerning travel of the user by public transportation via a terminal device, the terminal device being capable of acquiring a time and a position,
- wherein the travel information providing apparatus
  - acquires, from the terminal device, destination information indicating an alighting location of the user on the public transportation,
  - acquires first information and second information from the terminal device, the first information indicating a first time and a position of the terminal device at the first time, the second information indicating a second time and a position of the terminal device at the second time, the second time being later than the first time,
  - acquires, as a departure time of a transportation service of the public transportation that the user has boarded, a time at which a traveling speed of the terminal device has exceeded a first threshold value on the basis of the first information and the second information,
  - acquires, as a boarding location where the user has boarded the transportation service of the public transportation, a location where the traveling speed of the terminal device has exceeded the first threshold value on the basis of the first information and the second information,
  - acquires operation information indicating an operation schedule of the public transportation that runs in an operation route including the alighting location and the boarding location,
  - identifies the transportation service that the user has boarded on the basis of the departure time, the boarding location, and the operation information,
  - determines whether the transportation service that the user has boarded stops at the alighting location on the basis of the transportation service that the user has boarded, the alighting location, and the operation information, and
  - provides the user with information indicating that the transportation service that the user has boarded does not stop at the alighting location via the terminal device in a case in which it is determined that the transportation service that the user has boarded does not stop at the alighting location, wherein it is determined that the transportation service that the user has boarded stops at the alighting location in a case in which the operation information indicates that the transportation service that the user has boarded stops at the alighting location past the boarding location.

16. A non-transitory recording medium storing a program that causes a computer to execute the travel information providing method according to claim 1.

17. A travel information providing apparatus for providing a user traveling by public transportation with information concerning the travel via a terminal device, the terminal device being capable of acquiring a time and a position,
- wherein the travel information providing apparatus
  - acquires, from the terminal device, destination information indicating an alighting location of the user on the public transportation,
  - acquires current information from the terminal device, the current information indicating a current time and a position of the terminal device at the current time,
  - acquires identification information for identifying a transportation service of the public transportation that the user boards from a transmitter of the public transportation that the user boards,
  - acquires operation information indicating an operation schedule of the public transportation,
  - determines whether the transportation service that the user boards stops at the alighting location after the current time on the basis of the destination information, the current information, the identification information, and the operation information, and
  - provides the user, via the terminal device, information indicating that the transportation service that the user boards does not stop at the alighting location in a case in which it is determined that the transportation service that the user boards does not stop at the alighting location after the current time, wherein it is determined that the transportation service that the user boards stops at the alighting location in a case in which the operation information indicates that the transportation service that the user boards stops at the alighting location past the current position.

18. A non-transitory recording medium storing a program that causes a computer to execute the travel information providing method according to claim 13.

* * * * *